(12) United States Patent
Takeda et al.

(10) Patent No.: US 12,177,744 B2
(45) Date of Patent: Dec. 24, 2024

(54) UPLINK CONTROL CHANNEL RESOURCE ALLOCATION FOR ACKNOWLEDGEMENT OF DOWNLINK MULTICAST/BROADCAST

(71) Applicant: QUALCOMM Incorporated, San Diego, CA (US)

(72) Inventors: Kazuki Takeda, Minato-ku (JP); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/921,859

(22) Filed: Jul. 6, 2020

(65) Prior Publication Data

US 2021/0014647 A1    Jan. 14, 2021

Related U.S. Application Data

(60) Provisional application No. 62/871,639, filed on Jul. 8, 2019.

(51) Int. Cl.
*H04W 4/00* (2018.01)
*H04L 1/1812* (2023.01)
(Continued)

(52) U.S. Cl.
CPC ............ *H04W 4/06* (2013.01); *H04L 1/1819* (2013.01); *H04L 5/0055* (2013.01);
(Continued)

(58) Field of Classification Search
None
See application file for complete search history.

(56) References Cited

U.S. PATENT DOCUMENTS

| | | | |
|---|---|---|---|
| 2013/0188590 A1* | 7/2013 | Aiba | H04W 72/04 370/329 |
| 2014/0355493 A1* | 12/2014 | Niu | H04L 12/189 370/280 |

(Continued)

OTHER PUBLICATIONS

International Search Report and Written Opinion—PCT/US2020/041050—ISA/EPO—dated Oct. 6, 2020.

(Continued)

*Primary Examiner* — Clemence S Han
(74) *Attorney, Agent, or Firm* — Kevin M. Donnelly; ArentFox Schiff LLP

(57) ABSTRACT

Support for multicast and broadcast data transmissions and acknowledgement feedback for the transmissions are being considered in 5G new radio (NR). Resource allocation techniques are provided to allocate uplink control channel resources for acknowledgement of downlink multicast/broadcast (MC/BC) data transmissions. An apparatus, such as a user equipment, receives a multicast/broadcast (MC/BC) configuration indicating a first physical uplink control channel (PUCCH) resource set for transmitting MC/BC acknowledgment (ACK)/negative acknowledgment (NACK), and a unicast configuration indicating a second PUCCH resource set for transmitting unicast ACK/NACK feedback. The apparatus also receives MC/BC data from a base station. The apparatus determines a first PUCCH resource from the first PUCCH resource set for transmitting MC/BC ACK/NACK feedback in response to the received MC/BC data and based on the received MC/BC configuration. The apparatus transmits the MC/BC ACK/NACK feedback to the base station in the determined first PUCCH resource.

30 Claims, 14 Drawing Sheets

(51) Int. Cl.
  *H04L 5/00* (2006.01)
  *H04W 4/06* (2009.01)
  *H04W 72/0446* (2023.01)
  *H04W 72/21* (2023.01)
  *H04W 72/23* (2023.01)
  *H04W 72/30* (2023.01)
  *H04W 76/27* (2018.01)

(52) U.S. Cl.
  CPC ....... *H04W 72/0446* (2013.01); *H04W 72/21* (2023.01); *H04W 72/23* (2023.01); *H04W 72/30* (2023.01); *H04W 76/27* (2018.02)

(56) References Cited

U.S. PATENT DOCUMENTS

| | | | | |
|---|---|---|---|---|
| 2018/0152274 A1* | 5/2018 | Li | .......................... | H04L 5/0055 |
| 2019/0045488 A1* | 2/2019 | Park | ....................... | H04L 5/0048 |
| 2019/0110325 A1* | 4/2019 | Gulati | ................... | H04L 5/0032 |
| 2019/0132104 A1* | 5/2019 | Lee | ........................ | H04L 1/1664 |
| 2020/0022144 A1* | 1/2020 | Papasakellariou | ........................... | H04W 72/0413 |
| 2020/0204329 A1* | 6/2020 | Fujishiro | ........... | H04W 56/0045 |
| 2020/0314860 A1* | 10/2020 | Zhou | ..................... | H04W 72/14 |
| 2021/0037603 A1* | 2/2021 | Li | ........................ | H04L 1/1819 |
| 2021/0203468 A1* | 7/2021 | Yi | ......................... | H04W 76/27 |
| 2021/0218511 A1* | 7/2021 | Zhang | ................... | H04L 1/1664 |
| 2021/0234640 A1* | 7/2021 | Cirik | .................... | H04L 1/1819 |
| 2021/0243790 A1* | 8/2021 | Ji | .......................... | H04L 1/1896 |
| 2022/0070907 A1* | 3/2022 | Hofström | .......... | H04W 28/0278 |
| 2023/0044542 A1* | 2/2023 | Yao | ....................... | H04W 72/30 |

OTHER PUBLICATIONS

Qualcomm Incorporated: "Physical Layer Procedures for HARQ Operation for Groupcast and Unicast Transmissions", 3GPP Draft, 3GPP TSG RAN WG1 Meeting #96, R1-1902995, Physical Layer Procedures for HARQ Operation for Groupcast and Unicast Transmissions, 3rd Generation Partnership Project (3GPP), Mobile Competence Centre, 650, Route Des Lucioles, vol. RAN WG1, No. Athens, Greece, Feb. 25, 2019-Mar. 1, 2019, Feb. 16, 2019 (Feb. 16, 2019), XP051600692, 12 pages.

Item 2 Continued: Retrieved from the Internet: URL: http://www.3gpp.org/ftp/tsg%5Fran/WG1%5FRL1/TSGR1%5F96/Docs/R1%2D1902995%2Ezip , [retrieved on Feb. 16, 2019] the whole document.

* cited by examiner

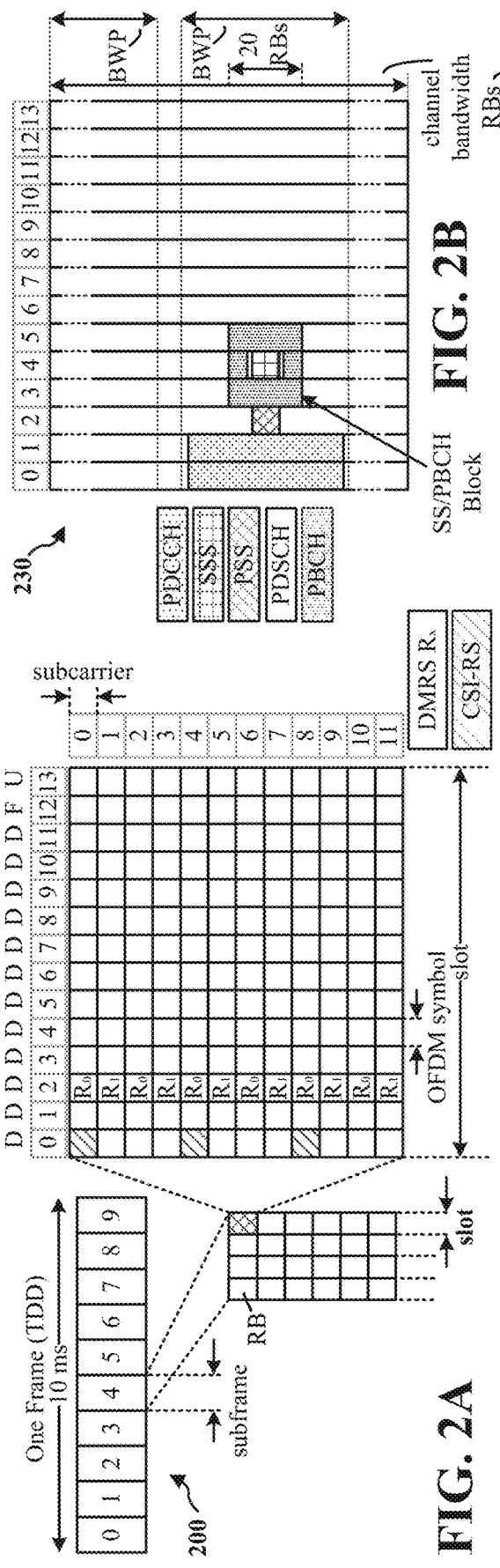
FIG. 2A
FIG. 2B
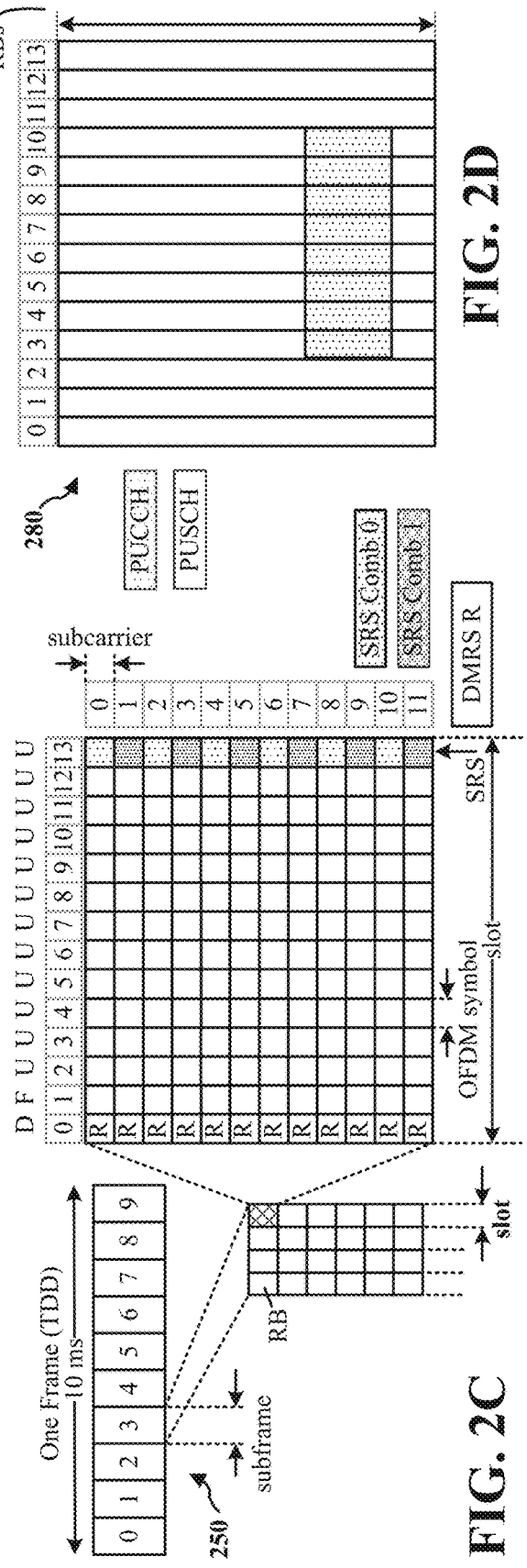
FIG. 2C
FIG. 2D

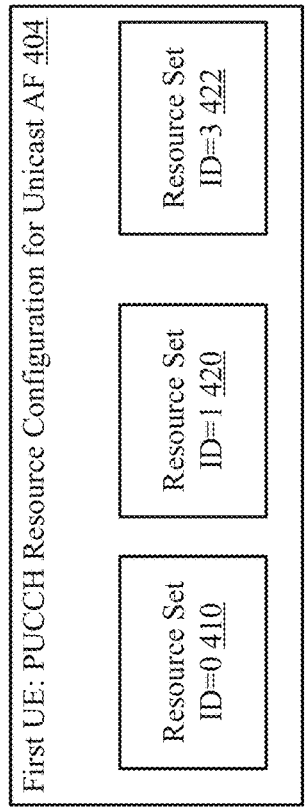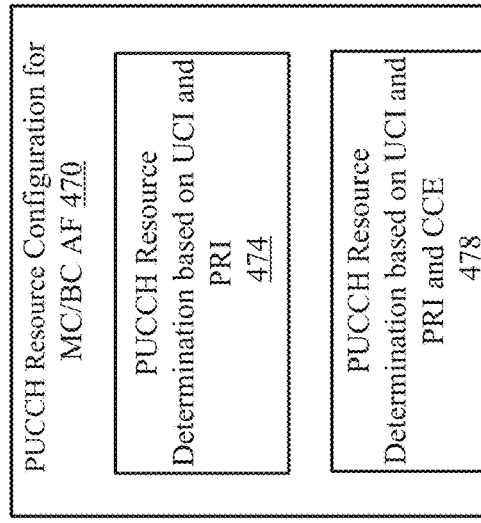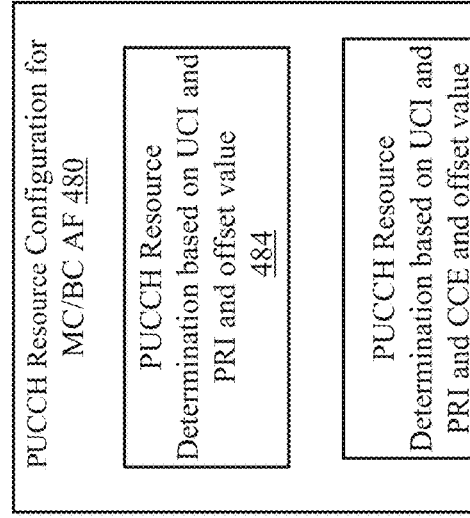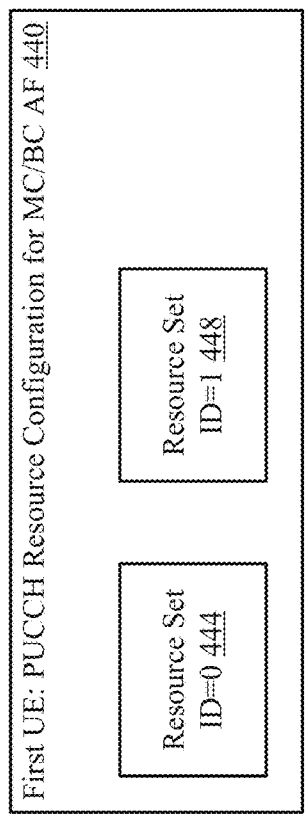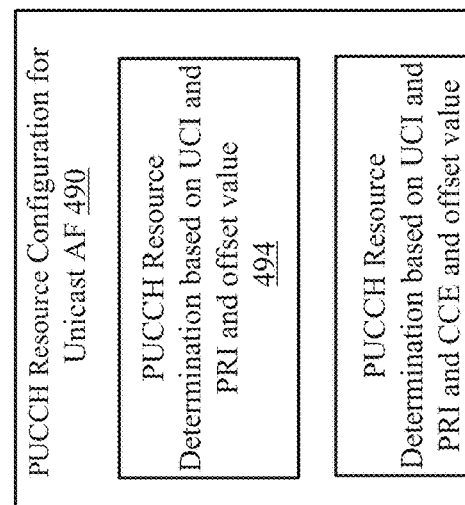
FIG. 4

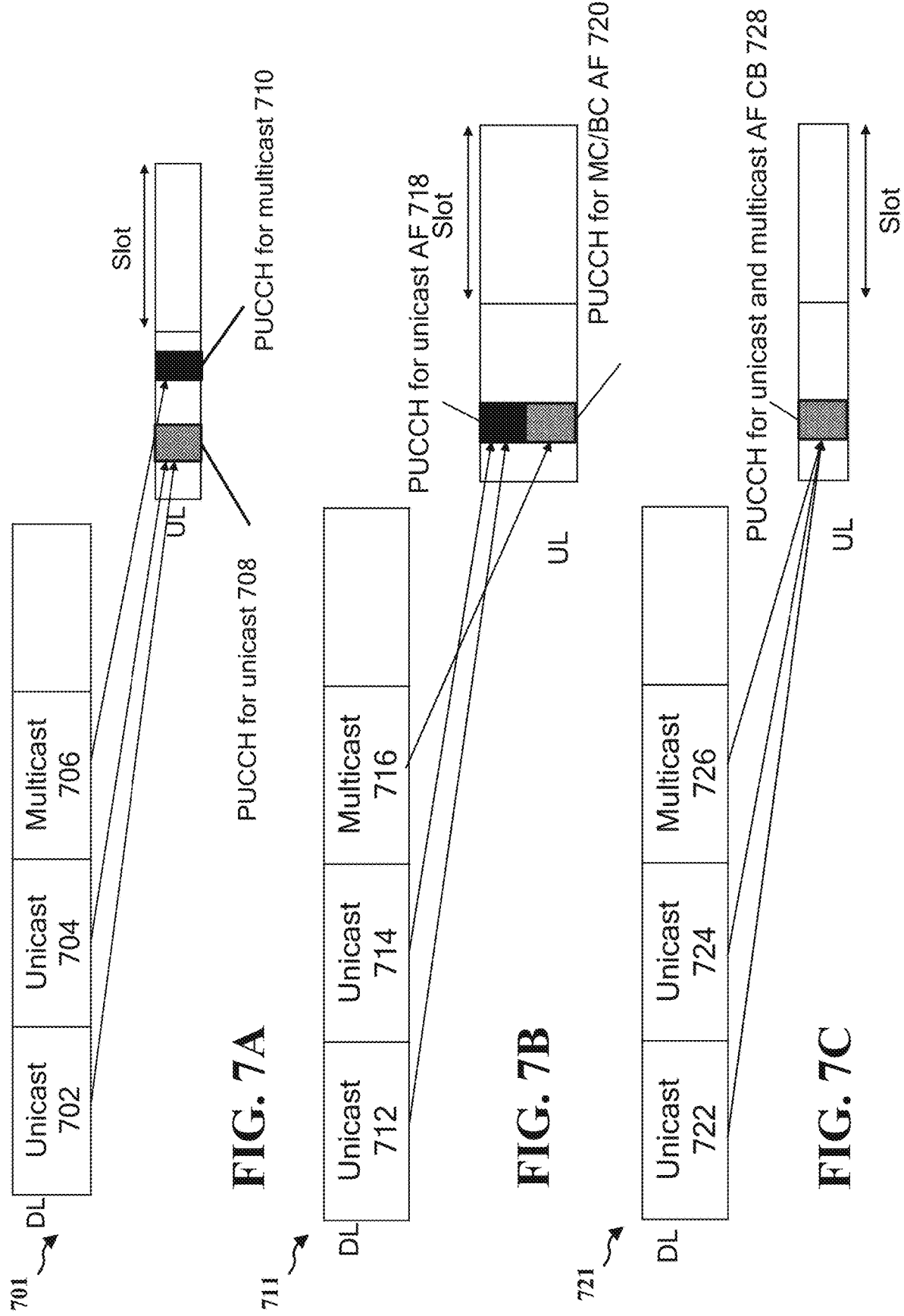

UPLINK CONTROL CHANNEL RESOURCE ALLOCATION FOR ACKNOWLEDGEMENT OF DOWNLINK MULTICAST/BROADCAST

CROSS REFERENCE TO RELATED APPLICATION(S)

This application claims the benefit of U.S. Provisional Application Ser. No. 62/871,639, entitled "UPLINK CONTROL CHANNEL RESOURCE ALLOCATION FOR ACKNOWLEDGEMENT OF DOWNLINK MULTICAST/BROADCAST" and filed on Jul. 8, 2019, which is expressly incorporated by reference herein in its entirety.

TECHNICAL FIELD

The present disclosure relates generally to communication systems, and more particularly, to uplink control channel resource allocation techniques for acknowledgement of downlink multicast/broadcast (MC/BC) transmissions.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC).

For 5G NR, support for multicast/broadcast (MC/BC) transmissions has been proposed. In addition, unlike in LTE MC/BC transmissions, where acknowledgement feedback was not supported, 5G NR is exploring the use of acknowledgement feedback of MC/BC transmissions in order to improve efficiency and reliability. There remains a need for new techniques in 5G NR technology to allocate uplink control channel resource(s) for acknowledgement of downlink multicast/broadcast (MC/BC) data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Resource allocation techniques are provided to allocate uplink control channel resources for acknowledgement of downlink multicast/broadcast (MC/BC) data transmissions.

In an aspect of the disclosure, a method, a computer-readable medium, and an apparatus are provided. An apparatus, such a user equipment (UE), receives a MC/BC configuration indicating a first physical uplink control channel (PUCCH) resource set for transmitting MC/BC acknowledgement (ACK)/negative acknowledgement (NACK) feedback. The apparatus also receives a unicast configuration indicating a second PUCCH resource set for transmitting unicast ACK/NACK feedback, the MC/BC configuration being different than the unicast configuration. The apparatus further receives MC/BC data from a base station. The apparatus determines a first PUCCH resource from the first PUCCH resource set for transmitting the MC/BC ACK/NACK feedback in response to the received MC/BC data and based on the received MC/BC configuration. The apparatus transmits the MC/BC ACK/NACK feedback to the base station in the determined first PUCCH resource.

In another aspect of the disclosure, a method, a computer-readable medium, and an apparatus are provided. An apparatus, such a base station, transmits to a UE a MC/BC configuration indicating a first PUCCH resource set for transmitting MC/BC ACK/NACK feedback. The apparatus also transmits to the UE a unicast configuration indicating a second PUCCH resource set for transmitting unicast ACK/NACK feedback, the MC/BC configuration being different than the unicast configuration. The apparatus further transmits MC/BC data to the UE. The apparatus receives, in response to the transmitted MC/BC data, the MC/BC ACK/NACK feedback from the UE in a first PUCCH resource of the first PUCCH resource set. The first PUCCH resource is based on the transmitted MC/BC configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, downlink (DL) channels within a 5G/NR subframe, a second 5G/NR frame, and uplink (UL) channels within a 5G/NR subframe, respectively.

FIG. 4 illustrates physical uplink control channel (PUCCH) resource configurations and resource determination techniques according to some implementations.

FIG. 7A is a diagram illustrating a time division multiplexed (TDM) unicast AF and MC/BC AF according to some implementations.

FIG. 7B is a diagram illustrating a frequency division multiplexed (FDM) unicast AF and MC/BC AF according to some implementations.

FIG. 7C is a diagram illustrating a code division multiplexed (CDM) unicast AF and MC/BC AF according to some implementations.

DETAILED DESCRIPTION

Figure 1:
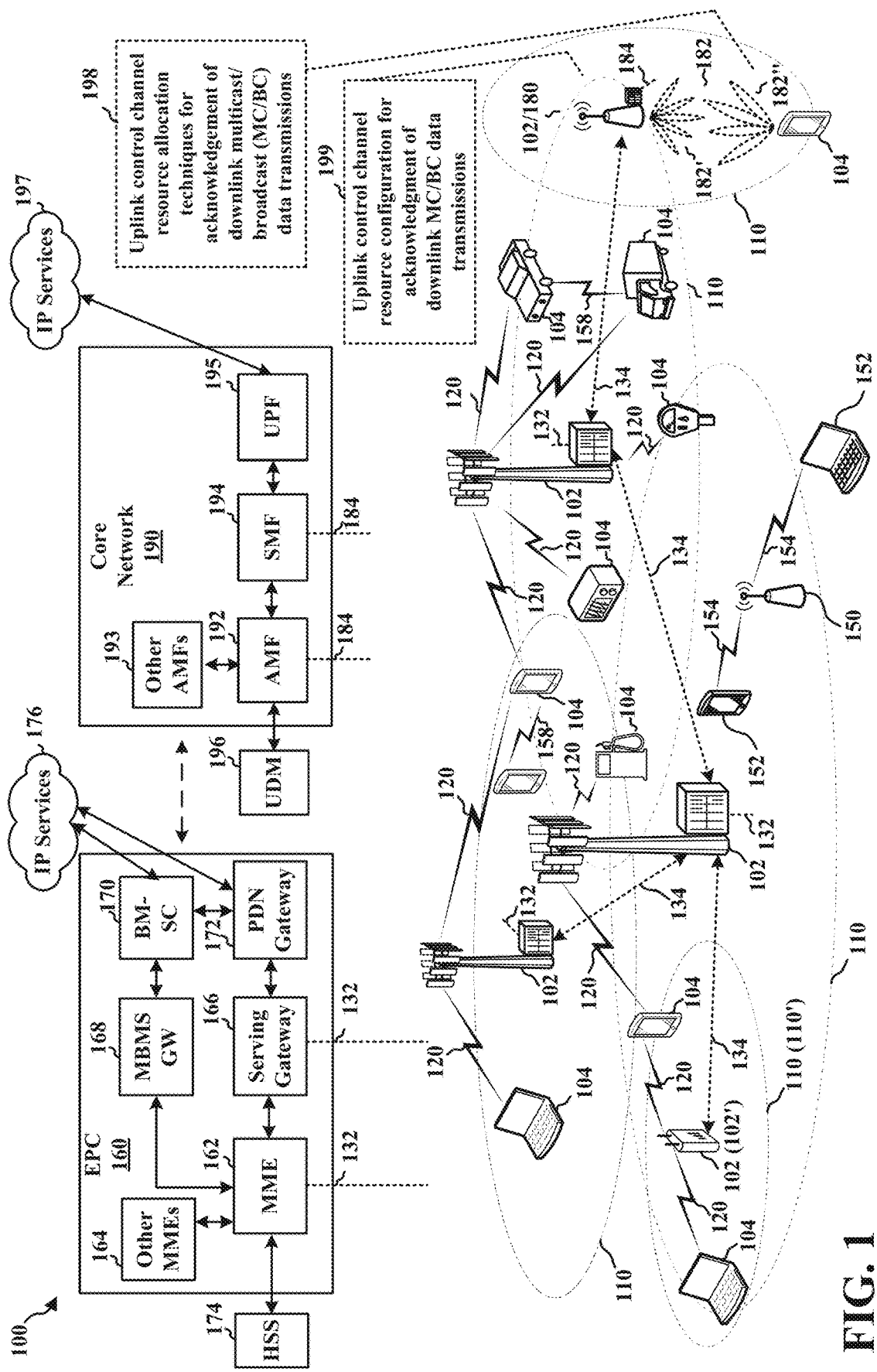
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to uplink control channel resource allocation techniques for acknowledgement of downlink multicast/broadcast (MC/BC) transmissions. Upon receiving MC/BC data from a base station, a UE acknowledges the receipt of the MC/BC data by sending MC/BC acknowledgement feedback (AF). The AF can include a positive acknowledgement (ACK) or a negative acknowledgement (NACK). The UE determines physical uplink control channel (PUCCH) resources to use in sending the MC/BC AF to the base station.

One technique for determining or allocating PUCCH resources for MC/BC AF is to have the base station indicate through radio resource control (RRC) a first configuration of PUCCH resources for use in MC/BC AF and through another RRC a second configuration of PUCCH resources for use in sending unicast AF. One advantage of this first technique is that MC/BC AF is not pre-empted by unicast AF because the first configuration of resources is independent from the second configuration of resources.

The first and second configurations of resources include two or more resource sets that each include two or more PUCCH resources. The UE determines a particular resource set from among the resource sets and then determines one or more PUCCH resources in the determined resource set based at least in part on various parameters.

In some implementations, once the UE determines a PUCCH resource (identified by an identifier) from the first configuration of resources, the UE applies an offset value to the identifier of the PUCCH resource to determine an identifier for a final PUCCH resource to use for MC/BC AF. In some other implementations, once the UE determines a PUCCH resource (identified by an identifier) from the second configuration of resources, the UE applies an offset value to the identifier of the PUCCH resource to determine an identifier for a final PUCCH resource to use for unicast AF.

A second technique for determining or allocating PUCCH resources for MC/BC AF is to have MC/BC AF and unicast AF share uplink resources. For example, the UE can use a time division multiplexing scheme, a frequency division multiplexing scheme or a code division multiplexing scheme to send MC/BC AF and unicast AF to the base station in a concurrent manner. One advantage of this second technique is that MC/BC AF and unicast AF may be sent to the base station in the same slot.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3

GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to implement one or more techniques 198 for allocating uplink resources, such as PUCCH resources, for non-unicast acknowledgment feedback (AF) of downlink non-unicast data (such as multicast/broadcast (MC/BC) data). These resource allocation techniques can be used by a UE to determine uplink resources for sending unicast AF with dedicated resources, MC/BC AF with dedicated resources, and unicast AF and MC/BC AF with shared resources. In other aspects, the base station 102/180 may be configured to transmit configurations 199 to the UE, such as a MC/BC configuration for the PUCCH resources and a unicast configuration for other PUCCH resources, and to receive from the UE non-unicast AF of downlink non-unicast data (such as MC/BC data) in the PUCCH resources.

These uplink resource(s) allocation techniques, which are described in greater detail hereinafter, are provided to determine a PUCCH resource for transmitting MC/BC acknowledgement (ACK)/negative acknowledgement (NACK) feedback to a base station in response to the received MC/BC data. These techniques are especially important to support the acknowledgement of MBMS and eMBMS data transmissions in 5G networks. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
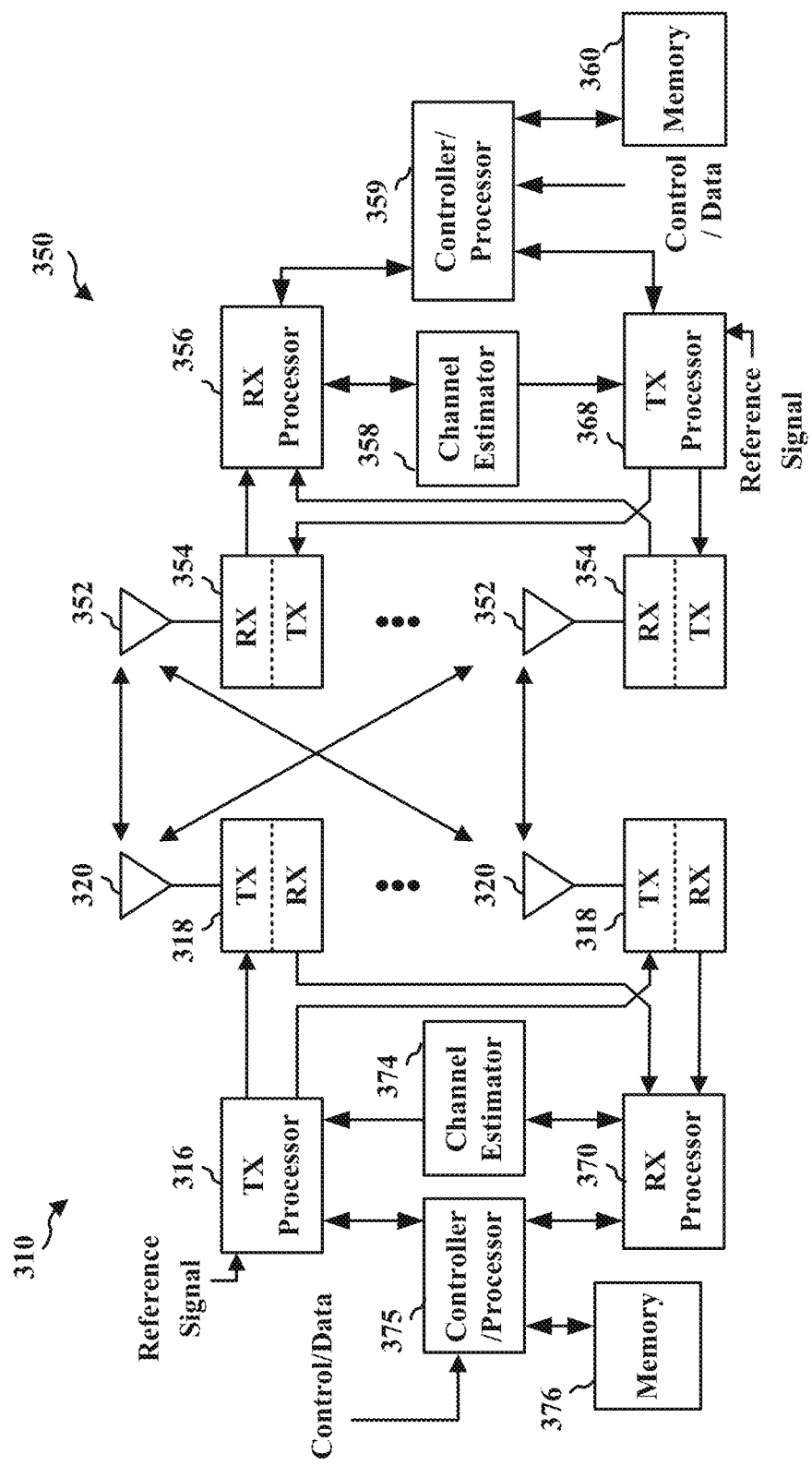
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with uplink control channel resource allocation techniques 198 for acknowledgement of downlink MC/BC data transmissions as described with reference to FIG. 1.

At least one of the TX processor 316, the RX processor 370, and the controller/processor 375 may be configured to perform aspects in connection with uplink control channel resource configuration 199 for acknowledgement of downlink MC/BC data transmissions as described with reference to FIG. 1.

MBMS may support sending the same multimedia content to all subscribers to the access network (referred to herein as a broadcast (BC)) or sending the same multimedia content to a group of subscribers in the network (referred to herein as multicast (MC)). Sending multimedia content to individual subscribers in a point-to-point fashion (referred to herein as unicast (UC)) is another way in which multimedia content is delivered (for example, music streaming applications associated with individual subscribers may consume music through UC). MBMS can support applications, such as TV programs, movies, sports events and music concerts. Also, as the Internet of Things (IoT) continues to proliferate, MC/BC may become more important as a useful tool to perform a software update on a program that may be executing on a number of similar machines.

In order to improve the reliability of MC/BC data transmissions, an error-control method for data transmission that uses acknowledgements can be utilized. For example, acknowledgements can be utilized to detect and to correct packet errors. There remains a need for techniques enabling a UE to determine uplink resources for sending acknowledgement feedback for received MC/BC data.

The techniques described below can be used by a UE to allocate uplink resources for sending AF for MC/BC data using a configuration of PUCCH resources that is independent from a configuration of PUCCH resources used for sending unicast AF. The described techniques also enable a UE to allocate uplink resources to send unicast data AF and MC/BC AF data in a concurrent fashion. Similarly, a base station may transmit the configuration of PUCCH resources to the UE and receive the AF for MC/BC data and unicast AF from the UE.

Independent PUCCH Resource Set(s) and PUCCH Resources for Unicast Acknowledgement and Multicast/Broadcast (MC/BC) Acknowledgement A first resource allocation technique provides independent PUCCH resource sets for use in acknowledging unicast data transmissions and independent PUCCH resource sets for use in acknowledging MC/BC data transmissions. Non-unicast data transmissions can include non-unicast multicast data transmissions, broadcast data transmissions, MBMS transmissions, eMBMS transmissions, and other transmissions that are point to multipoint.

FIG. 4 illustrates physical uplink control channel (PUCCH) resource configurations according to some implementations. For example, FIG. 4 illustrates a PUCCH resource configuration for unicast AF 404, a PUCCH resource configuration for MC/BC AF 440 and several PUCCH resource determination techniques that can be applied to the configurations to determine a PUCCH resource for use in sending MC/BC AF to a base station. The PUCCH resource configuration for unicast AF 404 and the PUCCH resource configuration for MC/BC AF 440 are for a first UE. The configurations may include PUCCH resource sets that are separately identified with identifiers (IDs) 410, 420, 422, 444, 448. Each UE may be separately configured with its own PUCCH resource configuration for MC/BC AF 440 and PUCCH resource configuration for unicast AF 404. The uplink resource allocation techniques may include different PUCCH resource determination techniques, such as techniques 474, 478, 484, 488, 494, and 498 according to some implementations.

When implementing techniques 474, 478, 484, 488, the UE uses a PUCCH resource configuration for MC/BC AF 470, 480. When implementing a first technique 474, the UE determines a PUCCH resource for MC/BC AF based on UCI and a PUCCH resource indicator (PRI). When implementing a second technique 478, the UE determines a PUCCH resource for MC/BC AF based on UCI and PRI and further on a CCE index. When implementing a third technique 484, the UE determines a PUCCH resource for MC/BC AF based on UCI, PRI and an offset value. When implementing a fourth technique 488, the UE determines a PUCCH resource for MC/BC AF based on UCI, PRI, a CCE index and an offset value. When implementing fifth and sixth techniques 494 and 498, the UE uses a PUCCH resource configuration for unicast AF 490. When implementing the fifth technique 494, the UE determines a PUCCH resource for unicast AF based on UCI, PRI and an offset value. When implementing a sixth technique 498, the UE determines a PUCCH resource for unicast AF based on UCI, PRI, a CCE index and an offset value.

In some implementations, a parameter used to configure a PUCCH resource for HARQ-ACK feedback for MC/BC data is different than a parameter used to configure a PUCCH resource for HARQ-ACK feedback for unicast data. For example, a configuration of the PUCCH resource(s) for transmitting MC/BC ACK/NACK feedback may be provided by a base station through a first set of RRC parameters, and a configuration of the PUCCH resource(s) for transmitting unicast ACK/NACK feedback may be provided by a second set of RRC parameters that may be different than the first set of RRC parameters. In some implementations, different parameters can be used to configure different UEs and different parameters can be used to configure the uplink resources (such as PUCCH resources) for unicast AF and MC/BC AF. The PUCCH resources may be different or may not be different across different UEs.

A UE configured to receive MC/BC data is also configured with a radio network temporary identifier (RNTI) for receiving the MC/BC data. The RNTI for receiving the MC/BC data is used for (1) scrambling a cyclic redundancy check (CRC) of a DCI format scheduling MC/BC data, (2) scrambling CRC of MC/BC data, or both. If the CRC of the DCI format scheduling the MC/BC data is scrambled by the RNTI for receiving the MC/BC data, the UE can distinguish whether a detected DCI format schedules unicast data or MC/BC data based on a CRC check. For example, if the CRC of the MC/BC data is scrambled by the RNTI for receiving the MC/BC data, the UE may determine that the received data is MC/BC data.

Figure 5:
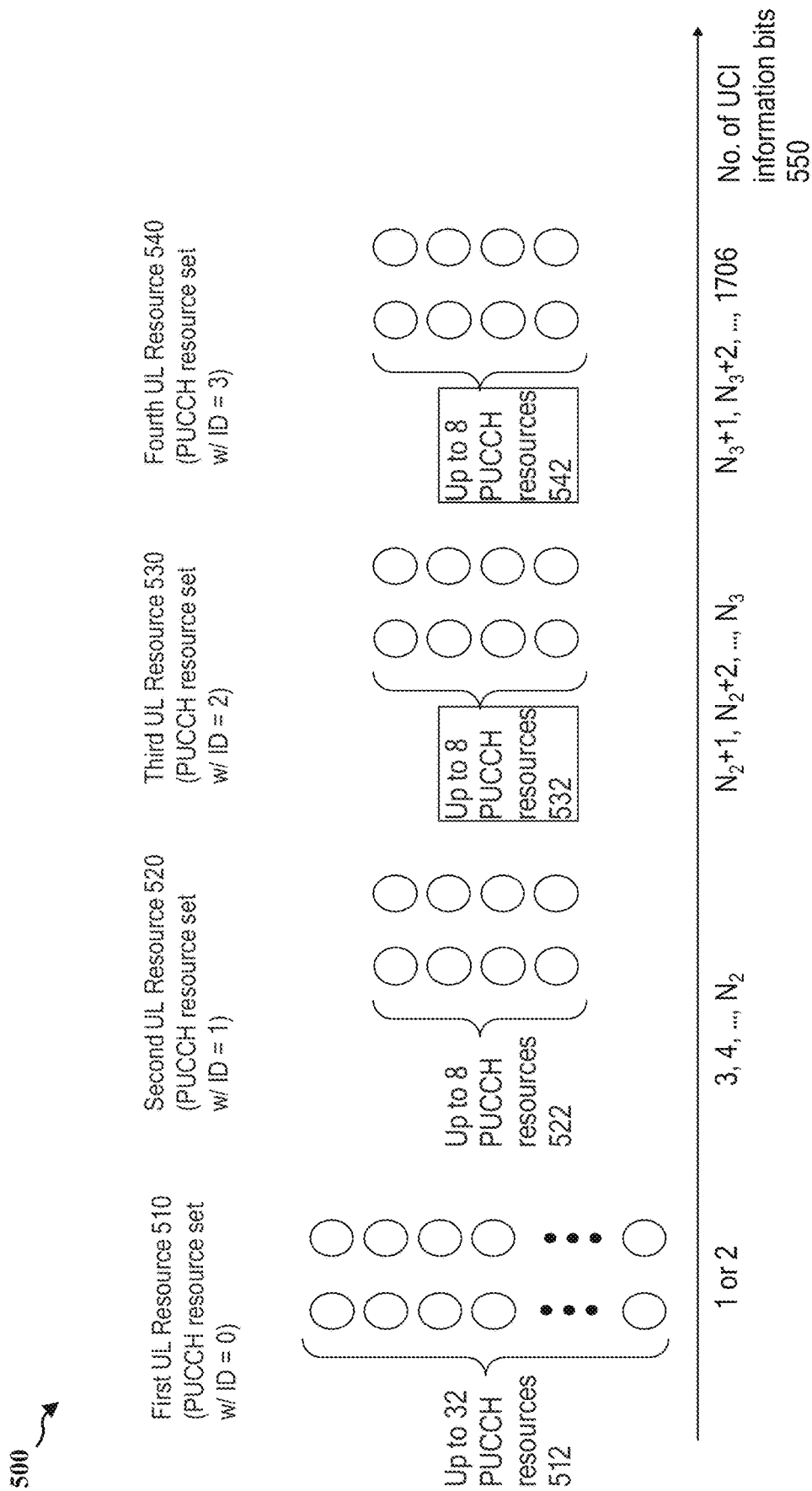
FIG. 5 is a diagram illustrating a number of resource sets that can be used for transmitting multicast/broadcast (MC/BC) acknowledgement feedback (AF) according to some implementations.

FIG. 5 is a diagram illustrating a number of PUCCH resource sets 500 that can be used for transmitting MC/BC AF according to some implementations. Referring to FIG. 5, the PUCCH resource configuration for MC/BC AF includes one or more PUCCH resource sets, where each PUCCH resource set includes one or more PUCCH resources. According to some implementations, the MC/BC configurations includes four PUCCH resource sets that are identified with an identifier (ID) of 0, 1, 2, or 3. The first PUCCH resource set 510 (PUCCH resource set with ID equal to 0) may have up to 32 PUCCH resources 512. The second PUCCH resource set 520, third PUCCH resource set 530, and fourth PUCCH resource set 540 correspond to PUCCH resource set with ID equal to 1, PUCCH resource set with ID equal to 2, and PUCCH resource set with ID equal to 3, respectively. Each of these PUCCH resource sets 520, 530, 540 may have up to 8 PUCCH resources (such as PUCCH resources 522, 532, 542). Each of the PUCCH resource sets also correspond to a certain number of UCI bits 550. For example, the first resource set 510 may correspond to 1 or 2 UCI bits, the second resource set 520 may correspond to 3 to $N_2$ UCI bits, the third resource set 530 may correspond to $N_2+1$ to $N_3$ UCI bits, and the fourth resource set 540 may correspond to $N_3+1$ to 1706 UCI bits, where $N_2$ and $N_3$ are predefined numbers of UCI bits with $N_3 > N_2$.

In some implementations, a PUCCH resource (such as resources 512, 522, 532, and 542) includes one or more of the following: a resource ID, a start resource block (start-RB), a second hop resource block (second-hop-RB), intra-slot frequency hopping (FH), format, format-specific parameters, or other parameters. When the UE receives MC/BC data from a base station, the UE may select a PUCCH resource set from the MC/BC PUCCH resource configuration and then may further select one or more specific PUCCH resources from that PUCCH resource set to send MC/BC AF to the base station. When a UE transmits HARQ-ACK feedback for MC/BC downlink data, the UE determines a PUCCH resource for HARQ-ACK for MC/BC AF according to the PUCCH resource(s) selected for the MC/BC data.

The MC/BC AF may be included in the UCI payload as a sequence of UCI bits. In some implementations, one or multiple bits in the UCI payload in the PUCCH may indicate an ACK/NACK for MC/BC data. The UE determines based on one or more bits in the UCI payload the PUCCH resource set from which to select one or more PUCCH resources that are utilized by the UE to send the MC/BC AF.

In an implementation, a PUCCH resource can be represented by an index. For AF, the resource index to use may be given as a function of the first CCE index in the PDCCH used to schedule the downlink data transmission. In this manner, there is no need to explicitly include information about PUCCH resources in the downlink scheduling assignment. In addition to dynamic scheduling using PDCCH, the base station may semi-persistently schedule a UE according to a specific pattern. In this case, configuration of the semi-persistent scheduling pattern includes information on the PUCCH index to use for AF.

For example, the UE may select one of the PUCCH resource sets according to the UCI payload. The UE may select the one PUCCH resource in the PUCCH resource set further based on a PRI value. For example, when the number of UCI bits is 1 or 2, and the first PUCCH resource set 510 is selected, the UE uses the PRI value and the first CCE index where the PDCCH is detected to identify one or more PUCCH resources for transmitting MC/BC AF.

The UE may detect DCI scheduling and determine that there is unicast data transmission, MC/BC data transmission, or both on the downlink. The UE can identify data transmissions directed to it by using a RNTI. For a PUCCH transmission for unicast AF (such as HARQ-ACK feedback) for unicast data, the UE may determine PUCCH resource(s) for the unicast AF according to the PRI in the DL DCI scheduling the unicast data. In some implementations, when the UCI payload is 1 or 2 bits, and the number of PUCCH resources in the PUCCH resource set with ID equal to 0 is more than eight, the UE also uses the first CCE index to determine the PUCCH resource to use for unicast AF.

For a PUCCH transmission for MC/BC AF for MC/BC data, the UE also may determine one or more PUCCH resources according to the PRI in the DL DCI scheduling the MC/BC data. In some implementations, when the UCI payload is 1 or 2 bits, and the number of PUCCH resources in the PUCCH resource set with ID equal to 0 is more than eight, the UE also uses the first CCE index to determine the PUCCH resource to use for MC/BC AF.

Offset Values

A UE can be configured to apply offset values to the ID(s) of the PUCCH resource(s) in each PUCCH resource set(s) for MC/BC AF. For example, when a UE transmits HARQ-ACK feedback for a MC/BC DL data, the UE may determine a PUCCH resource for HARQ-ACK for MC/BC AF according to an offset value applied to the ID of the PUCCH resource in the PUCCH resource set for the MC/BC AF.

In some implementations, the UE may select one of the PUCCH resource sets according to the UCI payload (such as the number of UCI information bits) in the PUCCH. One of the PUCCH resources in the PUCCH resource set may be further selected by the UE according to a PRI value. When the PUCCH resource set has an ID equal to 0, the UE may determine PUCCH resources based on both a PRI value and the first CCE index where the PDCCH is detected. In some implementations, the UE may add an offset value to the ID of the PUCCH resource in the PUCCH resource set to determine a final PUCCH resource. For each value of PRI, a different offset value may be configured. For example, a first offset value is configured for PRI equal to 0, and a second offset value is configured for PRI equal to 1, and so on.

Uplink Resource Allocation Process Flow

Figure 6:
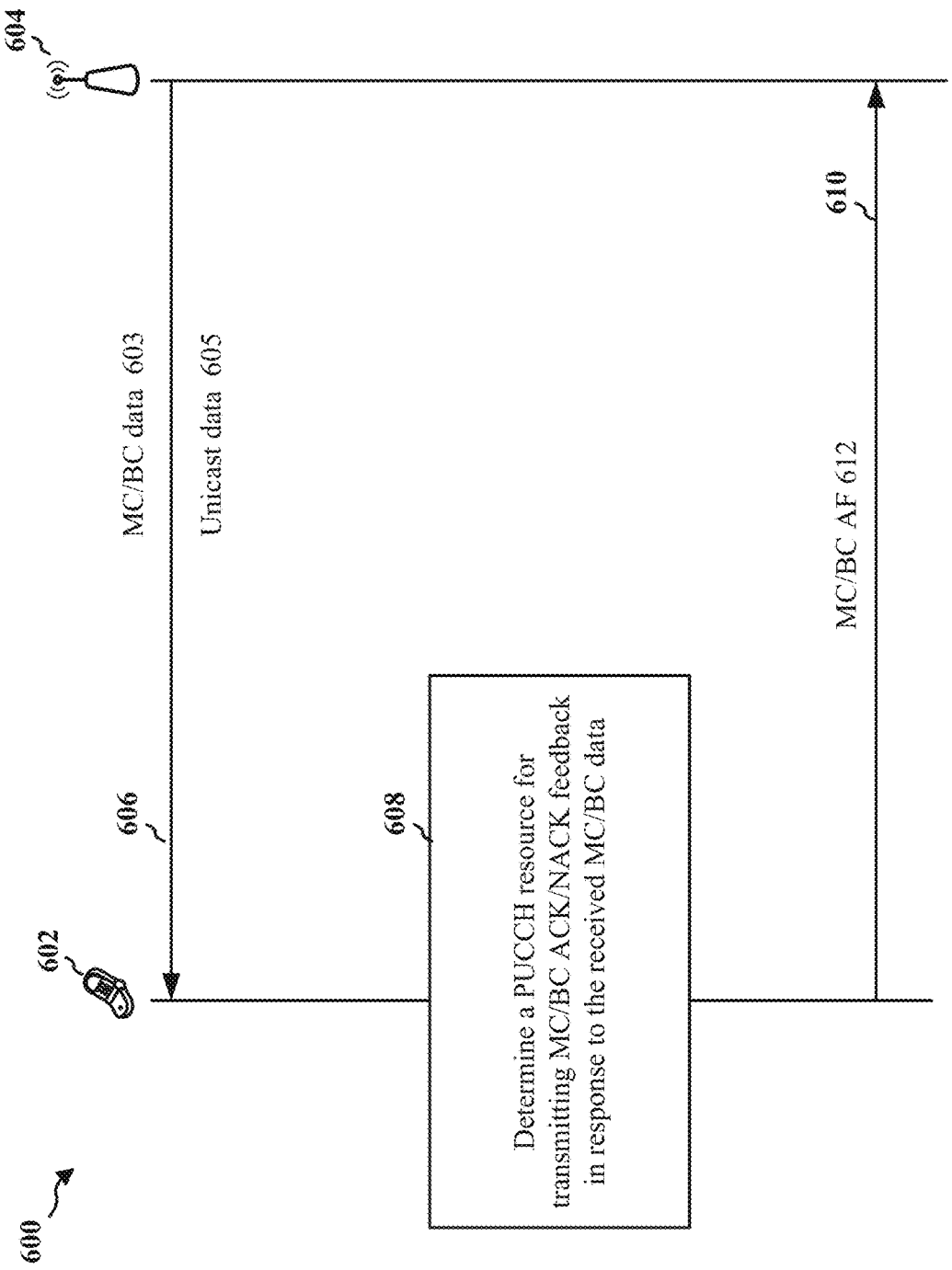
FIG. 6 illustrates a process flow for allocating PUCCH resources for transmitting MC/BC AF according to some implementations.

FIG. 6 illustrates a process flow 600 for allocating PUCCH resource(s) for transmitting MC/BC acknowledgement feedback (AF) according to some implementations. At 606, a UE 602 receives MC/BC data 603 from a base station 604. In some examples, the UE 602 also receives unicast data 605 from the base station 604 at 606.

In block 608, the UE 602 determines one or more PUCCH resources for transmitting MC/BC ACK/NACK feedback in response to the received MC/BC data 603. In some examples, in block 608, the UE 602 also determines PUCCH resources for transmitting unicast ACK/NACK feedback in response to the received unicast data 605 when unicast data 605 is received in block 606.

At 610, the UE 602 sends the MC/BC AF feedback 612 to the base station 604 in the determined PUCCH resource. In some examples, the UE 602 also sends unicast AF to the base station 604 at 610. In some implementations, at 610, the UE 602 sends the unicast AF on resources dedicated for unicast AF and sends MC/BC AF 612 on other resources dedicated for MC/BC AF. In some other implementations, the UE 602 may send unicast AF and MC/BC AF 612 on shared resources.

A UE may not expect to transmit more than one PUCCH with HARQ-ACK information in a slot. In this case, the first resource allocation technique described above operates as follows. In one slot, a HARQ-ACK for unicast is sent. In another slot, a HARQ-ACK for MC/BC is sent. One shortcoming of this approach is that two slots are necessary for sending HARQ-ACK feedback for MC/BC data and HARQ-ACK feedback for unicast data.

For a slot having a PUCCH for HARQ-ACK for MC/BC, HARQ-ACK for unicast may not be mapped to that slot. Similarly, for a slot having a PUCCH for HARQ-ACK for unicast, a HARQ-ACK for MC/BC may not be mapped to that slot. The second resource allocation technique, which is described below, may use shared resources to send unicast AF and MC/BC AF in a concurrent fashion. In some implementations, the UE may send the unicast AF and MC/BC AF in the same slot overcoming the shortcoming of the first technique. For example, the UE may utilize time division multiplexing (TDM), frequency division multiplexing (FDM), or code division multiplexing (CDM) to concurrently send the unicast AF and MC/BC AF.

Time Division Multiplexed (TDM) MC/BC AF and Unicast AF

FIG. 7A is a diagram 701 illustrating a TDM unicast AF 708 and MC/BC AF 710 according to some implementations. On the downlink, a first unicast data transmission 702 is followed by a second unicast data transmission 704, which in turn is followed by a MC/BC data transmission 706. On the uplink, PUCCH for unicast AF 708 (such as HARQ-ACK for unicast data 702, 704) and PUCCH for MC/BC AF 710 (such as HARQ-ACK for MC/BC data 706) may be time-division-multiplexed within the same slot or across slots.

In some implementations, for a given cell group or for a given PUCCH group, a PUCCH for HARQ-ACK for unicast data and a PUCCH for HARQ-ACK for MC/BC data may not overlap in time. In some other implementations, if a PUCCH for HARQ-ACK for unicast data and a PUCCH for HARQ-ACK for MC/BC data overlap in time, the UE may transmit only one of the MC/BC AF or the unicast AF, and drop the other AF. For example, the UE may select to transmit the unicast AF and drop the MC/BC AF. Alternatively, the UE may select to transmit the MC/BC AF and drop the unicast AF.

Frequency Division Multiplexed MC/BC AF and Unicast AF

FIG. 7B is a diagram 711 illustrating a frequency division multiplexed (FDM) unicast AF and MC/BC AF according to some implementations. On the downlink, a first unicast data transmission 712 is followed by a second unicast data transmission 714, which in turn is followed by a MC/BC data transmission 716. On the uplink, PUCCH for unicast AF 718 (such as HARQ-ACK for unicast data 712, 714) and PUCCH for MC/BC AF 720 (such as HARQ-ACK for MC/BC data 716) may be frequency division multiplexed within the same set of consecutive symbols as shown.

In some implementations, for a given cell group or for a given PUCCH group, a PUCCH for HARQ-ACK for unicast data and a PUCCH for HARQ-ACK for MC/BC data may not overlap in frequency. In some other implementations, if a PUCCH for HARQ-ACK for unicast data and a PUCCH for HARQ-ACK for MC/BC data overlap in frequency, the UE may transmit only one of the MC/BC AF or the unicast AF, and drop the other AF. For example, the UE may choose to transmit the unicast AF and drop the MC/BC AF. Alternatively, the UE may choose to transmit the MC/BC AF and drop the unicast AF.

In some implementations, the PUCCH resources are restricted to consecutive (or almost consecutive) physical resource blocks (PRBs) so that intermodulation distortion (IMD) can be reduced. Also, in some implementations, the FDM may be limited to particular PUCCH format(s), such as PUCCH format 2. PUCCH format 2 is already a CP-OFDM waveform which is non-transform-precoding, and therefore as long as the PRBs are consecutive, FDM does not negatively impact PUCCH format 2 performance.

For the frequency-multiplexed PUCCHs, the UE may further control the transmission power. In some implementations, the UE may control the transmission power according to the following expression:

$$P = \min\{P_{cmax,c}, P_{0\_PUCCH} + 10\log_{10}(M_{RB}^{PUCCH1} + M_{RB}^{PUCCH2}) + PL_c + \Delta + g_c\}$$

where $P_{(cmax,c)}$ is the maximum available transmit power, where $P_{(0\_PUCCH)}$ is the target received power, where $M_{RB}^{PUCCH1} + M_{RB}^{PUCCH2}$ is the sum of the number of frequency multiplexed resource blocks (RBs) of the frequency multiplexed PUCCHs, where $PL_c$ is the path loss (PL) measured by a reference signal (RS), where $\Delta$ are other parameter(s)/factor(s), and where $g_c$ is a transmit power control (TPC) command (such as an accumulation TPC command or absolute TPC command).

Code Division Multiplexed MC/BC AF and Unicast AF

FIG. 7C is a diagram 721 illustrating a code division multiplexed (CDM) unicast AF and MC/BC AF 728 according to some implementations. On the downlink, a first unicast data transmission 722 is followed by a second unicast data transmission 724, which in turn is followed by a MC/BC data transmission 726. On the uplink, PUCCH for unicast AF (such as HARQ-ACK for unicast data 722, 724) and PUCCH for MC/BC AF (such as HARQ-ACK for MC/BC data 726) can be code division multiplexed within the same slot as shown.

In some implementations, the UE multiplexes MC/BC AF and unicast AF in one AF codebook of a PUCCH within a slot. For example, the AF codebook can include both HARQ-ACK for unicast data and HARQ-ACK for MC/BC data. In another implementation, the UE generates the bits of the unicast AF by following CBG-based HARQ-ACK codebook determination and Type for HARQ-ACK codebook (either Type1 or Type2). The UE may generate the bit(s) of the MC/BC AF according to the techniques described below for the case where there is a single bit in the MC/BC AF and for the case where there is more than one bit in the MC/BC AF.

Single Bit in MC/BC AF

Figure 8A:
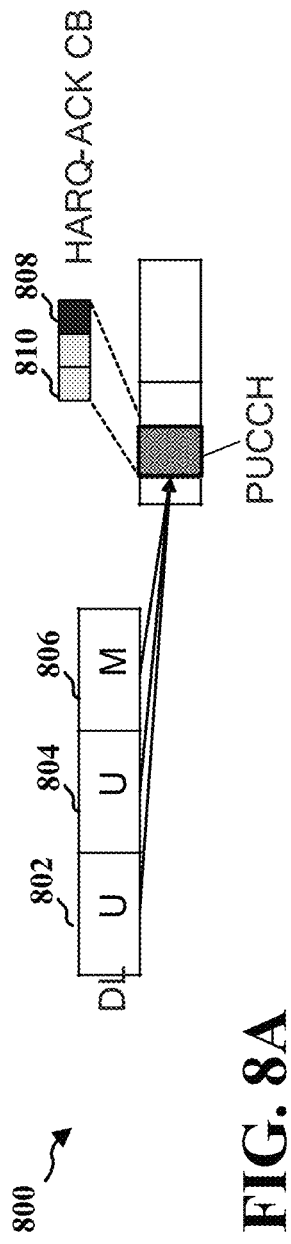
FIG. 8A is a diagram illustrating a codebook AF that includes unicast AF and MC/BC AF using a single bit for a first combination of data transmissions on the downlink.

FIG. 8A is a diagram 800 illustrating a codebook AF that includes unicast AF and MC/BC AF using a single bit for a first combination of data transmissions on the downlink. The first combination of data transmissions on the downlink may include two unicast data transmissions 802, 804 followed by a MC/BC data transmission 806. In this situation, the UE may append the MC/BC AF bit 808 to the end of the AF codebook (HARQ-ACK CB) after the bits 810 used for unicast AF.

Figure 8B:
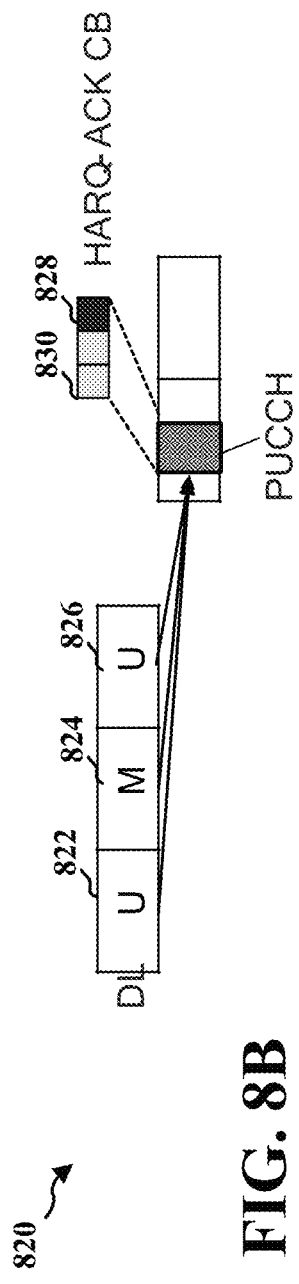
FIG. 8B is a diagram illustrating a codebook AF that includes unicast AF and MC/BC AF using a single bit for a second combination of data transmissions on the downlink.

FIG. 8B is a diagram 820 illustrating a codebook AF that includes unicast AF and MC/BC AF with a single bit for a second combination of data transmissions on the downlink. The second combination of data transmissions on the downlink may include one unicast data transmission 822 followed by a MC/BC data transmission 824, which in turn is followed by another unicast data transmission 826. In some implementations, although the MC/BC data is transmitted between two unicast data transmissions, the MC/BC AF 828 may be appended to the end of the AF codebook (HARQ-ACK CB) after the bits 830 used for unicast AF.

For a given PUCCH transmission, when the number of bits in the AF for MC/BC data is one, the UE may append the MC/BC AF to the HARQ-ACK codebook for unicast as long as there is an AF for unicast transmission. For example, the HARQ-ACK bit for MC/BC data may be appended to the end of the HARQ-ACK codebook for unicast. The UE may determine whether to append the MC/BC AF bit (such as HARQ-ACK bit for MC/BC) to the unicast HARQ-ACK codebook according to whether there is a possible PDSCH occasion for MC/BC in an AF window.

In some implementations, the UE may determine a PUCCH resource(s) based on the PRI in the latest scheduling DCI among the DCIs scheduling unicast data and MC/BC data whose ACK/NACK bits are multiplexed on the PUCCH. When the latest scheduled DCI corresponds to unicast data, the UE may determine a PUCCH resource(s) based on the PRI of the latest unicast data and the configurations of PUCCH resources/PUCCH resource sets configured for unicast AF. When the latest scheduled DCI corresponds to MC/BC data, the UE determines a PUCCH resource(s) based on the PRI of the latest MC/BC data and the configurations of PUCCH resources/PUCCH resource sets configured for MC/BC AF. When there is no AF for unicast in the PUCCH, the UE may determine a PUCCH resource by using the PRI in the scheduling DCI for MC/BC data and the configurations of PUCCH resources/PUCCH resource sets configured for MC/BC AF. The UE may transmit the MC/BC AF by using either a PUCCH format 0 or PUCCH format 1.

Alternatively, in other implementations, when there is a unicast data transmission followed by an MC/BC data transmission, the UE may use the PRI of the last unicast data transmission and the configurations of PUCCH resources/PUCCH resource sets configured for unicast AF to determine the PUCCH resource(s). When there is only a non-unicast data transmission (such as a MC/BC transmission), the UE may use the PRI of the MC/BC transmission and the configurations of PUCCH resources/PUCCH resource sets configured for MC/BC AF to determine a PUCCH resource (s). The UE may also use a first CCE index of the MC/BC PDCCH, in addition to the PRI of the MC/BC transmission, to select a PUCCH resource when the PUCCH resource set has an ID equal to 0.

In some implementations, the UE may append a single MC/BC ACK/NACK bit after the unicast HARQ-ACK codebook even if the UE does not receive MC/BC data. In this manner, the base station and UE have a common understanding of the MC/BC ACK/NACK bit generation. For example, a single bit ACK/NACK feedback for MC/BC may be appended regardless of whether the DCI scheduling MC/BC data is indeed detected in a monitoring occasion. As long as MC/BC data is potentially scheduled, or it is possible for DCI to be sent, this one bit may be present based on the semi-static configuration of MC/BC data reception and PDCCH monitoring for MC/BC data reception. A missed detection of PDCCH that schedules MC/BC data does not impact whether the MC/BC ACK/NACK bit is appended. In this case, the UE does not need to use a downlink assignment index (DAI) since the MC/BC ACK/NACK bit is semi-statically added.

Multiple Bits in MC/BC AF

Figure 8C:
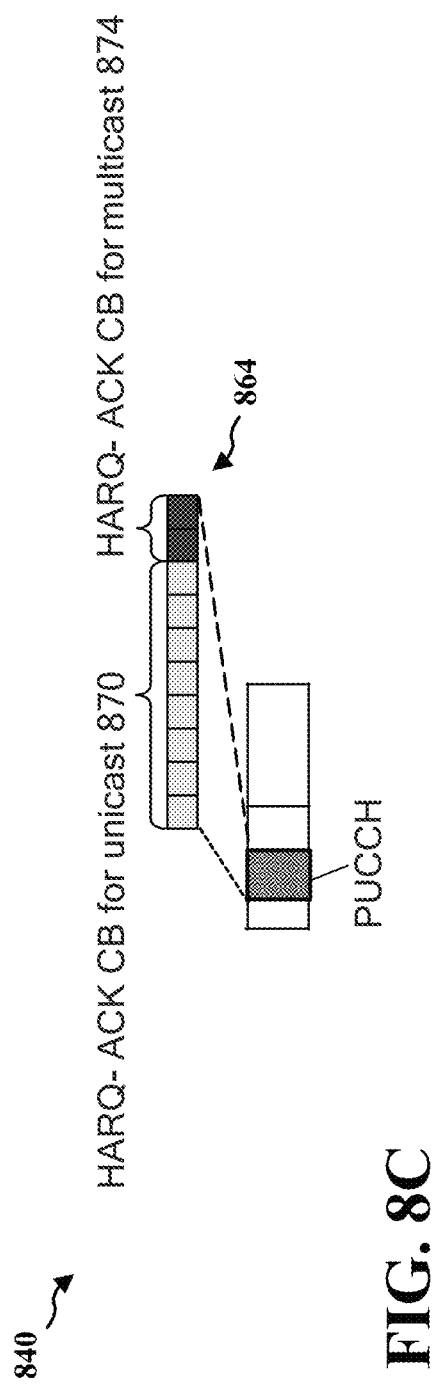
FIG. 8C is a diagram illustrating a codebook AF that includes unicast AF and MC/BC AF using more than one bit according to some implementations.

FIG. 8C is a diagram 840 illustrating a codebook AF 864 that includes unicast AF 870 (such as a HARQ ACK codebook for unicast) and MC/BC AF 874 with more than one bit (such as a HARQ ACK codebook for MC/BC) according to some implementations. The UE determines the number of bits in the MC/BC AF (such as the number of bits in MB/BC HARQ-ACK) and the bit order according to the DAI(s) of DL DCI(s) for MB/BC data. The UE determines the number of bits in the unicast AF (such as the number of bits in unicast HARQ-ACK) and the bit order according to the DAI(s) of DL DCI(s) for unicast. In some implementations, the UE determines the uplink resource(s), such as PUCCH resource(s), based at least in part on the PRI in the latest scheduling DCI among the DCIs scheduling unicast data and MC/BC data.

When there is unicast AF, the UE generates the MC/BC AF bits according to the DAI(s) of DL DCI(s) for MC/BC data (such as DCIs for MC/BC data) and appends the MC/BC AF bits to the AF codebook for unicast. The number of MC/BC ACK/NACK bits may be zero or any value. The UE uses the DAI to develop a common understanding of the MC/BC ACK/NACK bits. When there is no AF for unicast in the PUCCH, the UE transmits the MC/BC AF bit(s) using PUCCH resource(s) determined based on the PRI in the scheduling DCI for MC/BC data.

Referring to FIG. 8C, the total AF bits 864 included in the UCI and sent using PUCCH resources has both unicast AF bits and MC/BC AF bits. In some implementations, the total AF bits 864 include an AF codebook for unicast 870 that includes one or more bits to acknowledge unicast transmissions and an AF codebook for MC/BC 874 that includes one or more bits to acknowledge MC/BC data transmissions.

In some implementations, the UE determines PUCCH resource(s) for MC/BC AF, such as MC/BC HARQ-ACK, based at least in part on the DCI scheduling the MB/BC data. In one example, these PUCCH resource(s) for MC/BC AF can be independent from PUCCH resource(s) for unicast AF. In another example, the MC/BC AF and the unicast AF can share one or more PUCCH resource(s).

Figure 9:
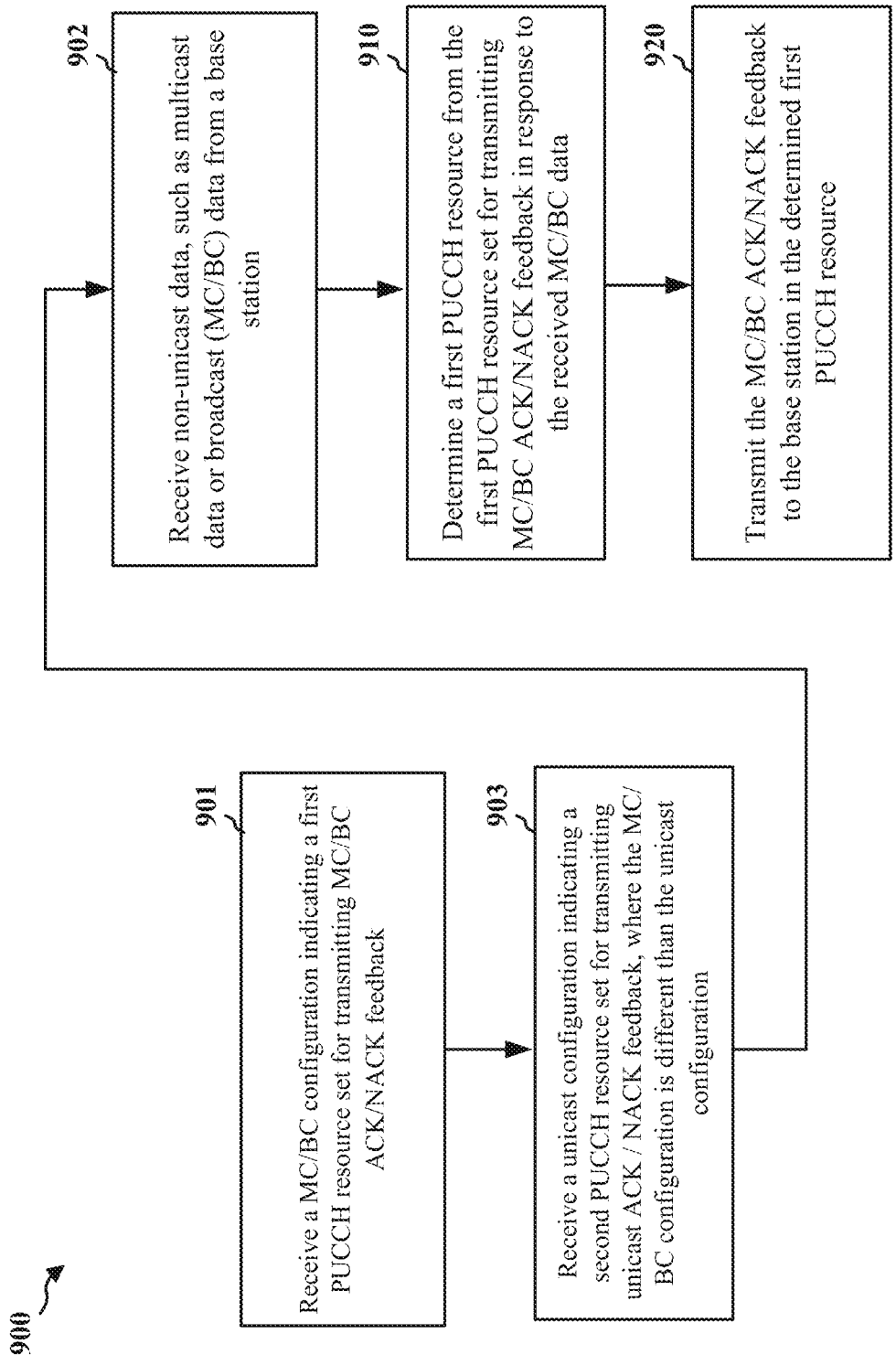
FIG. 9 is a flowchart illustrating a process for wireless communication according to some implementations.

FIG. 9 is a flowchart illustrating a process 900 for wireless communication. The process 900 may be performed by a UE (e.g. UE 104, 350, 602, 1002) or one or more of its components. For example, the process 900 may be performed by the UE, the apparatus 1002/1002', or the processing system 1114, which may include the memory 360 and which may be the entire UE or a component of the UE, such as the TX processor 368, the RX processor 356, and/or the controller/processor 359).

In block 901, the UE receives a multicast/broadcast (MC/BC) configuration indicating a first physical uplink control channel (PUCCH) resource set for transmitting MC/BC acknowledgement (ACK)/negative acknowledgement (NACK) feedback. For example, 901 may be performed by reception component 1004 of FIG. 10. For example, referring to FIGS. 4-6, the UE 602 may receive a PUCCH resource configuration for MC/BC AF 440, 470, 480 from base station 604 indicating a PUCCH resource set 444, 448 (e.g. PUCCH resource set 510, 520, 530, 540).

In block 903, the UE receives a unicast configuration indicating a second PUCCH resource set for transmitting unicast ACK/NACK feedback, the MC/BC configuration being different than the unicast configuration. For example, 903 may be performed by reception component 1004 of FIG. 10. For example, referring to FIGS. 4 and 6, the UE 602 may receive a PUCCH resource configuration for unicast AF 404, 490 from base station 604 indicating another PUCCH resource set 410, 420, 422 (e.g. PUCCH resource set 510, 520, 530, 540).

In block 902, the UE receives non-unicast data, such as MC/BC data from a base station. For example, 902 may be performed by non-unicast data and unicast data receiving component 1012 of FIG. 10. For example, referring to FIGS. 6-8B, the UE 602 may receive MC/BC data 603, 706, 716, 726, 806, 824 from the base station 604.

In block 910, the UE determines an uplink resource, such as a first PUCCH resource from the first PUCCH resource set, for transmitting a MC/BC AF in response to the received MC/BC data and based on the received MC/BC configuration. The MC/BC AF can be a MC/BC HARQ AF or other MC/BC ACK/NACK feedback. For example, 910 may be performed by AF uplink resource allocation component 1014 of FIG. 10. For example, referring to FIGS. 4-8B, at block 608 and according to one of the techniques 474, 478, 484, 488 for PUCCH resource determination, the UE 602 may determine a first PUCCH resource (e.g. from the PUCCH resources 512, 522, 532, 542 in one of the PUCCH resource sets 510, 520, 530, 540 respectively) for transmitting the MC/BC AF 614 (e.g. on PUCCH for MC/BC AF 710, 720, or 728) in response to the received MC/BC data 603, 706, 716, 726, 806, 824 and based on the received MC/BC configuration 440, 470, 480.

Finally, in block 920, the UE transmits the MC/BC AF to the base station in the determined uplink resource. In some implementations, the MC/BC AF is sent in its own slot. In another implementation, the MC/BC AF is sent with unicast AF concurrently in a single slot or across several slots. For example, 920 may be performed by non-unicast AF and unicast AF transmission control component 1016 of FIG. 10. For example, referring to FIGS. 4-8B, the UE 602 may transmit the MC/BC AF 612 to the base station 604 in the determined first PUCCH resource (e.g. from the PUCCH resources 512, 522, 532, 542 in the one of the PUCCH resource sets 510, 520, 530, 540 respectively).

In one example, the UE may receive an offset value, and the first PUCCH resource for transmitting the MC/BC ACK/NACK feedback is determined at 910 based at least in part on adding the offset value to an ID of a unicast or multicast PUCCH resource for transmitting the unicast ACK/NACK feedback. For example, referring to FIGS. 4-7C, the UE 602 may perform PUCCH resource determination at block 608 based on the UCI and PRI and offset value (according to techniques 484, 488, 494, 498). For instance, the UE may receive an offset value from the base station 604, and the UE may add the offset value to an identifier 410, 420, 422, 444, 448 (e.g. 0, 1, 2, or 3) of a PUCCH resource including unicast AF 708, 718 or a PUCCH resource including MC/BC AF 710, 720 (e.g. from one or more of the PUCCH resources 512, 522, 532, 542 in one of the PUCCH resource sets 510, 520, 530, 540 respectively that is determined based on the added offset value).

In one example, the UE may receive on a PDCCH DCI scheduling the MC/BC data. In another example, the UE may receive a CCE index of the PDCCH on which the MC/BC data is scheduled, and the UE may determine the one or more first PUCCH resources for transmitting the MC/BC ACK/NACK feedback further based on the CCE index. In either example, the UE may also determine a PRI based on the received DCI or the CCE index, and the UE may determine the first PUCCH resource for transmitting the MC/BC ACK/NACK feedback based at least in part on the PRI. For example, referring to FIGS. 4-7C, the UE 602 may perform PUCCH resource determination at block 608 based on the UCI (received in DCI from base station 604) and PRI (according to techniques 474, 478, 484, 488), or based on the CCE and PRI (according to techniques 478, 488).

In one example, the MC/BC configuration indicates the first PUCCH resource for transmitting the MC/BC ACK/NACK feedback. For instance, referring to FIGS. 4-6, the PUCCH resource configuration for MC/BC AF 440 may indicate the first PUCCH resource (e.g. one or more of the PUCCH resources 512, 522, 532, 542 in the one of the PUCCH resource sets 510, 520, 530, 540 respectively) for transmitting the MC/BC AF 612. As an example, the MC/BC configuration may be received in a first set of radio resource control (RRC) parameters, and the unicast configuration may be received in a second set of RRC parameters, the first set of RRC parameters being different than the second set of RRC parameters. For instance, referring to FIGS. 4-6, the PUCCH resource configuration for MC/BC AF 440 may be provided to the UE in a first set of RRC parameters. The configuration may indicate the first PUCCH resource (e.g. one or more of the PUCCH resources 512, 522, 532, 542 in one of the PUCCH resource sets 510, 520, 530, 540 respectively) for transmitting the MC/BC AF 612. In contrast, the PUCCH resource configuration for unicast AF 404 may be provided to the UE in a different set of RRC parameters. The configuration may indicate the second PUCCH resource (e.g. another of the PUCCH resources 512, 522, 532, 542 in a same or different one of the PUCCH resource sets 510, 520, 530, 540 respectively) for transmitting unicast ACK/NACK feedback (e.g. on PUCCH in PUCCH resource including unicast AF 708, 718) in response to unicast data 702, 712, 722.

In one example, the UE may receive unicast data from the base station, and determine a second PUCCH resource from the second PUCCH resource set for transmitting the unicast ACK/NACK feedback in response to the received unicast data. The UE may transmit, based on receiving the unicast data, the unicast ACK/NACK feedback in the determined second PUCCH resource in a same set of slots or a same set of resource blocks within a subframe as the MC/BC ACK/NACK feedback in the determined first PUCCH resource. The MC/BC ACK/NACK feedback and the unicast ACK/NACK feedback may be TDM or FDM. For example, referring to FIGS. 5-7C, the UE 602 may receive unicast data 605, 702, 712, 722 from the base station 604, and determine the second PUCCH resource (e.g. one or more of the PUCCH resources 512, 522, 532, 542 in one of the PUCCH resource sets 510, 520, 530, 540 respectively) in response to the received unicast data. The UE may transmit the MC/BC AF 612 and the unicast AF in the same set of slots within a subframe (e.g. using TDM as illustrated in FIG. 7A) or in a same set of resource blocks within the subframe as the unicast AF (e.g. using FDM as illustrated in FIG. 7B).

In one example, the UE may receive unicast data from the base station, determine a second PUCCH resource from the second PUCCH resource set for transmitting the unicast ACK/NACK feedback in response to the received unicast data, and transmit, based on receiving the unicast data, the unicast ACK/NACK feedback in the determined second PUCCH resource. The transmitting may include appending the MC/BC ACK/NACK feedback to an end of the unicast ACK/NACK feedback within a hybrid automatic repeat request (HARQ) ACK/NACK codebook associated with the second PUCCH resource. For instance, referring to FIGS. 6-8C, the UE 602 may concurrently transmit the MC/BC AF 612 with the unicast AF using CDM in the second PUCCH resource including unicast and MC/BC AF 728, and the bits 808, 828, 874 in the HARQ-ACK CB corresponding to the MC/BC AF 612 may be appended to an end of the bits 810, 830, 870 in the HARQ-ACK CB corresponding to the unicast AF. For example, the UE may append the MC/BC AF 612 (e.g. bit 828) to the end of the unicast ACK/NACK feedback (e.g. bits 830) within the HARQ ACK/NACK codebook in response to receiving the unicast data 826 after the MC/BC data 824 as illustrated in FIG. 8B. In another example, when determining the second PUCCH resource associated with the HARQ ACK/NACK codebook, the UE may determine the second PUCCH resource based on a PUCCH resource indicator (PRI) in a latest scheduling DCI among the unicast data and the MC/BC data. For instance, the PRI may comprise a unicast PRI determined based on unicast downlink control information (DCI) associated with the unicast ACK/NACK feedback when the latest scheduling DCI corresponds to the unicast data 826 (as in FIG. 8A), or the PRI may comprise a MC/BC PRI determined based on MC/BC DCI associated with the MC/BC ACK/NACK feedback when the latest scheduling DCI corresponds to the MC/BC data 806 (as in FIG. 8B).

In a further example, the MC/BC ACK/NACK feedback may include a single bit for a given PUCCH transmission (e.g. bit 808, 828 in FIGS. 8A, 8B), and where the unicast ACK/NACK feedback exists for the given PUCCH transmission (e.g. as indicated by bits 810, 830 in FIGS. 8A, 8B), the UE may append the MC/BC ACK/NACK feedback to an end of the unicast ACK/NACK feedback, the unicast ACK/NACK feedback and the MC/BC ACK/NACK feedback being transmitted concurrently. In another example, the MC/BC ACK/NACK feedback includes a plurality of bits for a given PUCCH transmission (e.g. bits 874 in FIG. 8C), and where the unicast ACK/NACK feedback exists for the given PUCCH transmission (e.g. as indicated by bits 870 in FIG. 8C), the UE may generate the MC/BC ACK/NACK feedback 612 based on a DAI of DCI for the MC/BC data 603 and append the MC/BC ACK/NACK feedback to the unicast ACK/NACK feedback (e.g. append bits 874 to the end of bits 870) in the HARQ-ACK CB on PUCCH resource including unicast and MC/BC AF 728. The second PUCCH resource (e.g. PUCCH resource including unicast and MC/BC AF 728) may be based on the PRI in a latest scheduling DCI among the scheduled unicast data 605 and the MC/BC data 603.

In an additional example, the UE may further determine whether to transmit the unicast ACK/NACK feedback concurrently (e.g. as illustrated in FIGS. 7B and 7C) or independently (e.g. as illustrated in FIG. 7A) with the MC/BC ACK/NACK feedback. In response to determining to transmit the unicast ACK/NACK feedback concurrently with the MC/BC ACK/NACK feedback, the UE may determine the PUCCH resource for transmitting the MC/BC ACK/NACK feedback (e.g. PUCCH resource including MC/BC AF 720) based on a unicast PRI determined based on unicast DCI associated with the unicast ACK/NACK feedback. Otherwise, in response to determining to transmit the MC/BC ACK/NACK feedback independently of the unicast ACK/NACK feedback, the UE may determine the PUCCH resource for transmitting the MC/BC ACK/NACK feedback (e.g. PUCCH resource including MC/BC AF 710) based on a MC/BC PRI determined based on MC/BC DCI associated with the MC/BC ACK/NACK feedback.

In another example, the UE may receive unicast data from the base station, and determine a second PUCCH resource from the second PUCCH resource set for transmitting the unicast ACK/NACK feedback in response to the received unicast data. For example, referring to FIGS. 5-7C, the UE 602 may receive unicast data 605, 702, 712, 722 from the base station 604, and determine the second PUCCH resource (e.g. one or more of the PUCCH resources 512, 522, 532, 542 in one of the PUCCH resource sets 510, 520, 530, 540 respectively) in response to the received unicast data. The UE may determine that the first PUCCH resource (e.g. another of the PUCCH resources 512, 522, 532, 542 in a same or different one of the PUCCH resource sets 510, 520, 530, 540 respectively) for transmitting the MC/BC ACK/NACK feedback and the second PUCCH resource for transmitting the unicast ACK/NACK feedback may overlap in time (e.g. as illustrated in FIG. 7B where PUCCH resources including unicast AF 718 and MC/BC AF 720 overlap in time, or as illustrated in FIGS. 7C and 8-8C where the PUCCH resource for transmitting MC/BC AF and unicast AF 728 overlaps in time). Based on the determination of the overlap, the UE may determine, before transmitting the MC/BC ACK/NACK feedback (e.g. MC/BC AF 612) to drop the unicast ACK/NACK feedback from the second PUCCH resource. For instance, the UE may transmit the MC/BC AF 720 but not the unicast AF 718 in FIG. 7B, or the UE may transmit only the MC/BC AF in FIG. 7C.

In one example, the UE may select the first PUCCH resource set from a plurality of PUCCH resource sets based at least in part on a number of bits in UCI, where the selected PUCCH resource set includes the first PUCCH resource. For example, referring to FIGS. 5-7C, the UE 602 may select the first PUCCH resource set from one of PUCCH resource sets 510, 520, 530, 540 based at least in part on a number of bits in UCI (e.g. number of UCI information bits 550), where the selected PUCCH resource set includes the first PUCCH resource (e.g. from PUCCH resources 512, 522, 532, 542, which may include PUCCH resources including MC/BC AF 710, 720). When determining the first PUCCH resource at 910, the UE may select the first PUCCH resource for transmitting the MC/BC ACK/NACK feedback (e.g. at least one of the PUCCH resources 512, 522, 532, 542) from the selected PUCCH resource set based at least in part on a PRI.

Figure 10:
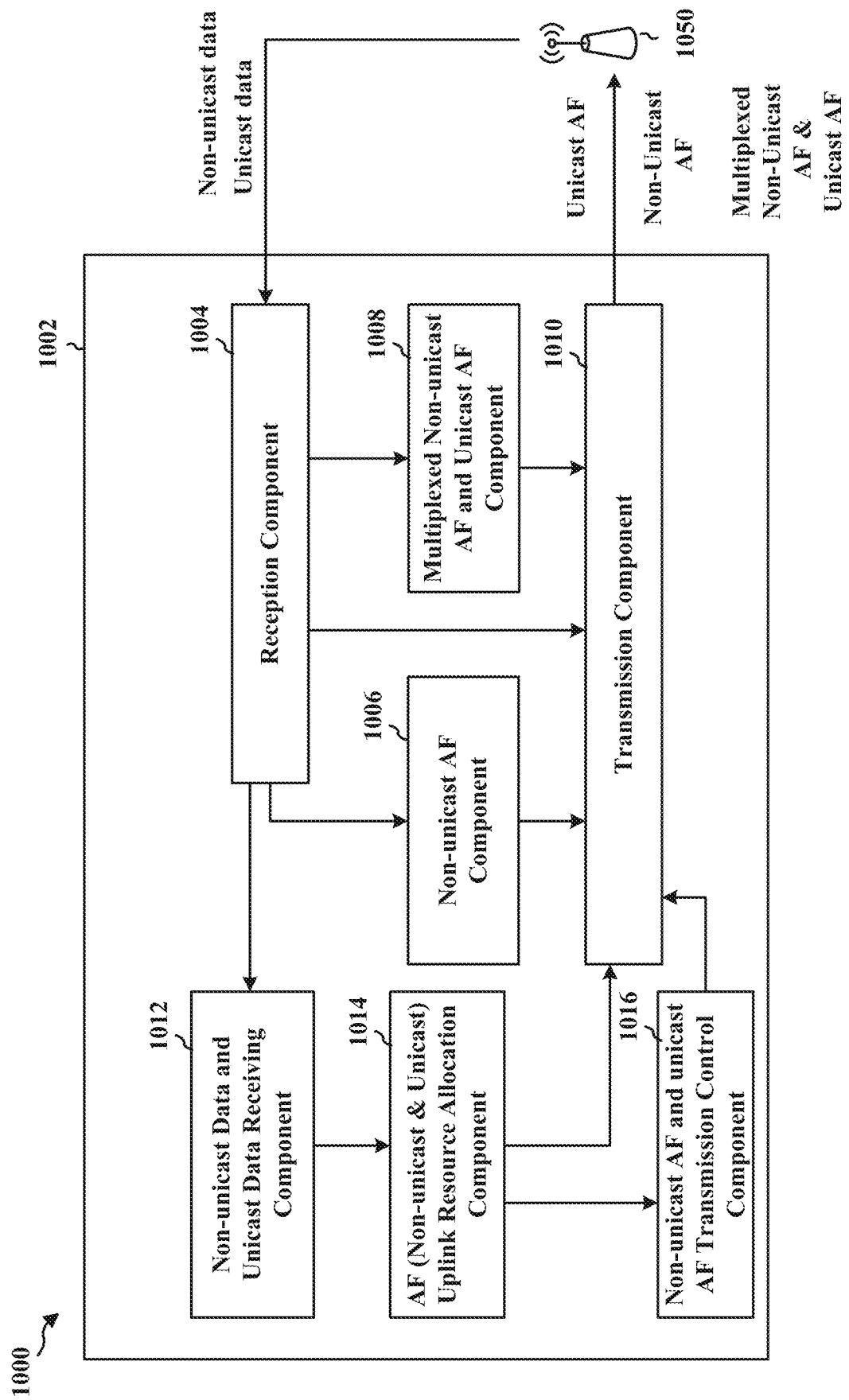
FIG. 10 is a data flow diagram illustrating the data flow between different means/components in an example apparatus.

FIG. 10 is a conceptual data flow diagram 1000 illustrating the data flow between different means/components in an example apparatus 1002. The apparatus 1002 may be a UE (e.g. UE 104, 350, 602) or one of its components (for example, a processing element and a modem) in communication with a base station 1050 (e.g. the base station 102/180, 310, 604). The apparatus includes a MC/BC Data and Unicast Data Receiving Component 1012 that receives data from the base station as described in connection with step 902 of FIG. 9. The received data can be non-unicast data, such as MC/BC data, or unicast data.

The apparatus 1002 may also include an Acknowledgement Feedback (AF) Uplink Resource Allocation Component 1014 that may allocate uplink resources for MC/BC AF and unicast AF as described in connection with block 910 of FIG. 9. The apparatus also includes an Non-unicast AF and unicast AF Transmission Control Component 1016 that may transmit MC/BC AF and unicast AF as described in connection with block 920 of FIG. 9. The apparatus 1002 also includes a non-unicast Acknowledgement Feedback (AF) Component 1006 that may allocate PUCCH resources for non-unicast AF when the non-unicast AF has non-shared resources and a Multiplexed Non-unicast AF and Unicast AF Component 1008 that may allocate PUCCH resources for non-unicast AF and unicast AF that share one or more resources.

The apparatus 1002 may include additional components that perform each of the blocks of the algorithms described with reference to the call flow 600 and process 900 of FIGS. 6 and 9, respectively. As such, each block described with reference to FIGS. 6 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
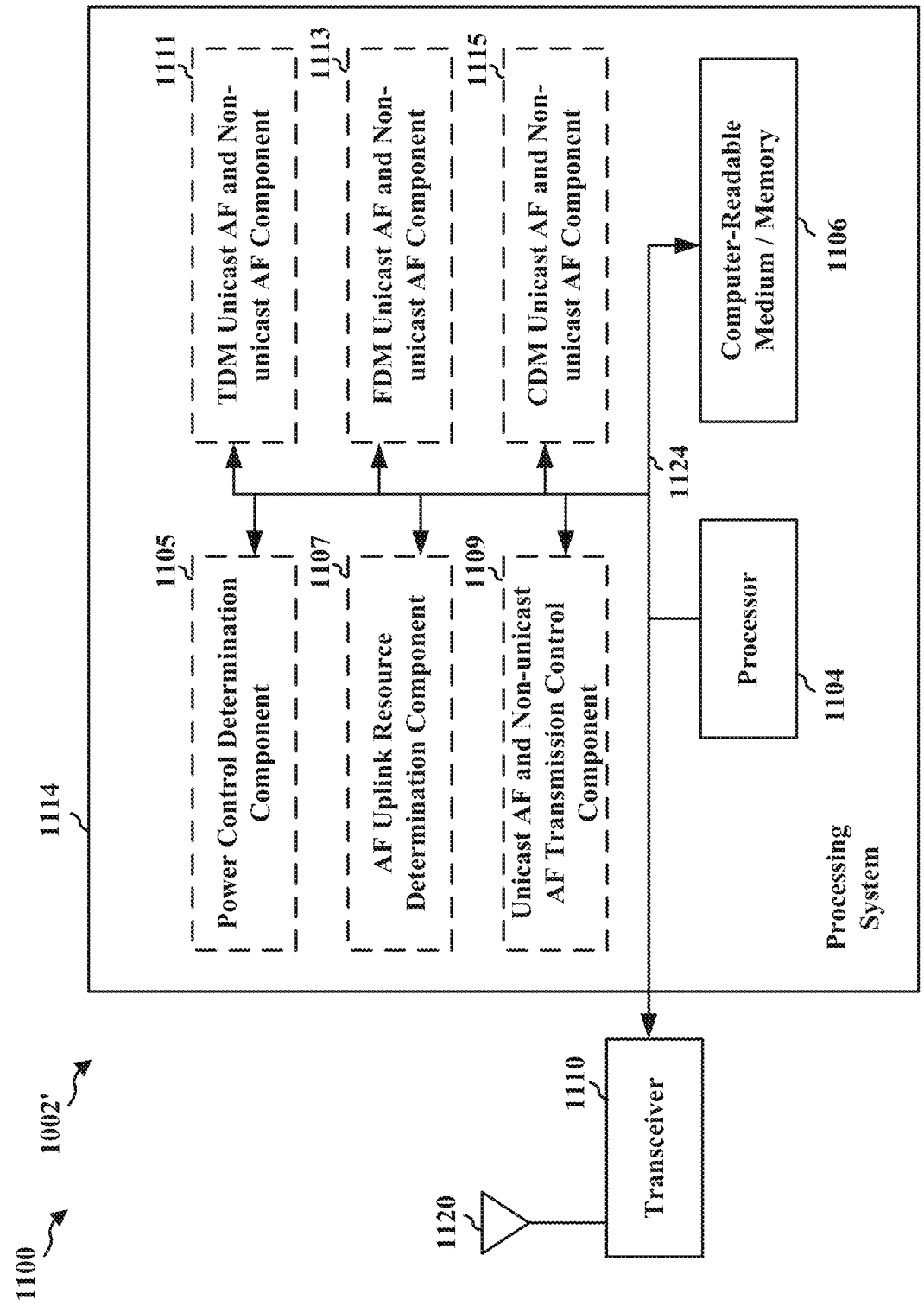
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1105, 1107, 1109, 1111, 1113, 1115, and the computer-readable medium/memory 1106. The bus 1124 may also link various other circuits such as timing sources, peripherals, voltage regulators, and power management circuits, which are well known in the art, and therefore, will not be described any further.

The processing system 1114 includes an Acknowledgement Feedback (AF) Uplink Resource Determination Component 1107 that may determine uplink resources for acknowledging MC/BC data and unicast data. For example, AF Uplink Resource Determination Component 1107 may perform step 910 of FIG. 9 by determining one or more PUCCH resources for transmitting MC/BC ACK/NACK feedback in response to received MC/BC data. The AF Uplink Resource Determination Component 1107 may also determine uplink resources for transmitting unicast AF in response to received unicast data. The processing system 1114 also includes a Unicast AF and Non-unicast AF Transmission Control Component 1109 that may send both a MC/BC AF and a unicast AF over shared resources in a concurrent manner.

The processing system 1114 also includes a time division multiplexed (TDM) Unicast AF and Non-unicast AF Component 1111, a FDM Unicast AF and Non-unicast AF Component 1113, a code division multiplexed (CDM) Unicast AF and Non-unicast AF Component 1115, a Power Control Determination Component 1105. The TDM Unicast AF and Non-unicast AF Component 1111 may send a MC/BC AF and a unicast AF over time-multiplexed shared resources. The FDM Unicast AF and Non-unicast AF Component 1113 may send a MC/BC AF and a unicast AF over frequency-multiplexed shared resources. In some implementations, when MC/BC AF and a unicast AF are sent over frequency-multiplexed shared resources, the Power Control Determination Component 1105 may control the power of the transmission of the FDM MC/BC AF and the unicast AF. The Power Control Determination Component 1105 may also control the transmission power for the other techniques for sending MC/BC AF and unicast AF with dedicated resources or shared resources to the base station. The CDM Unicast AF and Non-unicast AF Component 1115 may send a MC/BC AF and a unicast AF over code division-multiplexed shared resources.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114. In addition, the transceiver 1110 receives information from the processing system 1114, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described previously for any particular apparatus. The computer-readable medium/memory 1106 may also be used for storing data that is manipulated by the processor 1104 when executing software. The processing system 1114 further includes at least one of the components 1105, 1107, 1109, 1111, 1113, and 1115. The components may be software components running in the processor 1104, resident/stored in the computer readable medium/memory 1106, one or more hardware components coupled to the processor 1104, or some combination thereof.

The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002' for wireless communication includes means for receiving MC/BC data from a base station. The apparatus 1002' also includes means for determining PUCCH resources for transmitting MC/BC ACK/NACK feedback in response to the received MC/BC data. The apparatus 1002' further includes means for transmitting the MC/BC ACK/NACK feedback to the base station in the determined PUCCH resource.

The aforementioned means may be one or more of the aforementioned components of the apparatus 1002' and/or the processing system 1114 of the apparatus 1002' configured to perform the functions recited by the aforementioned means. As described above, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
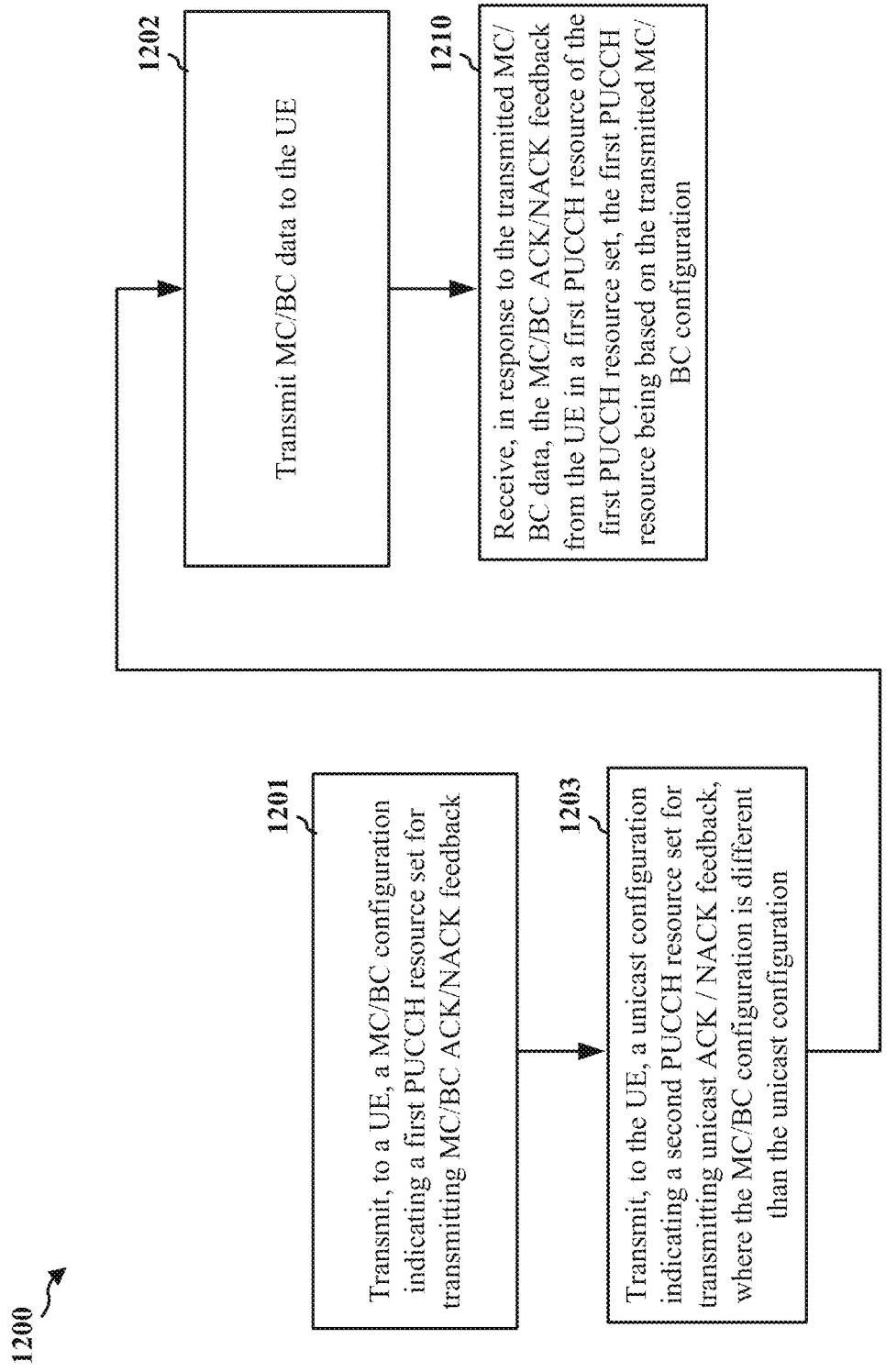
FIG. 12 is a flowchart illustrating a process for wireless communication according to some implementations.

FIG. 12 is a flowchart illustrating a process 1200 for wireless communication. The process 1200 may be performed by a base station (e.g. base station 102/180, 310, 604) or one or more of its components. For example, the process 1200 may be performed by the base station, the apparatus 1302/1302', or the processing system 1414, which may include the memory 376 and which may be the entire base station or a component of the base station, such as the TX processor 316, the RX processor 370, and/or the controller/processor 375).

In block 1201, the base station transmits, to a user equipment (UE), a multicast/broadcast (MC/BC) configuration indicating a first physical uplink control channel (PUCCH) resource set for transmitting MC/BC acknowledgement (ACK)/negative acknowledgement (NACK) feedback. For example, 1201 may be performed by transmission component 1310 of FIG. 13. For example, referring to FIGS. 4 and 6, the base station 604 may transmit and the UE 602 may receive a PUCCH resource configuration for MC/BC AF 440, 470, 480 from base station 604 indicating a PUCCH resource set 444, 448 (e.g. PUCCH resource set 510, 520, 530, 540).

In block 1203, the base station transmits, to the UE, a unicast configuration indicating a second PUCCH resource set for transmitting unicast ACK/NACK feedback, the MC/BC configuration being different than the unicast configuration. For example, 1203 may be performed by transmission component 1310 of FIG. 13. For example, referring to FIGS. 4 and 6, the base station 604 may transmit and the UE 602 may receive a PUCCH resource configuration for unicast AF 404, 490 from base station 604 indicating another PUCCH resource set 410, 420, 422 (e.g. PUCCH resource set 510, 520, 530, 540).

In block 1202, the base station transmits MC/BC data to the UE. For example, 1202 may be performed by non-unicast data and unicast data transmitting component 1312 of FIG. 13. For example, referring to FIGS. 6-8B, the UE 602 may receive MC/BC data 603, 706, 716, 726, 806, 824 from the base station 604.

Finally, in block 1210, the base station receives, in response to the transmitted MC/BC data, the MC/BC ACK/NACK feedback from the UE in a first PUCCH resource of the first PUCCH resource set, the first PUCCH resource being based on the transmitted MC/BC configuration. For example, 1210 may be performed by non-unicast AF and unicast AF reception control component 1316 of FIG. 13. For example, referring to FIGS. 4-8B, at block 608 and according to one of the techniques 474, 478, 484, 488 for PUCCH resource determination, the UE 602 may determine a first PUCCH resource (e.g. from one or more of the PUCCH resources 512, 522, 532, 542 in one of the PUCCH resource sets 510, 520, 530, 540 respectively) for transmitting the MC/BC AF 614 (e.g. on PUCCH for MC/BC AF 710, 720, or 728) in response to the received MC/BC data 603, 706, 716, 726, 806, 824 and based on the received MC/BC configuration 440, 470, 480. The base station 604 may receive from the UE 602 the MC/BC AF 612 in the determined first PUCCH resource (e.g. from the one or more of the PUCCH resources 512, 522, 532, 542 in the one of the PUCCH resource sets 510, 520, 530, 540 respectively).

In one example, the base station may transmit unicast data to the UE, and the base station may receive, in response to the transmitted unicast data, the unicast ACK/NACK feedback in a second PUCCH resource of the second PUCCH resource set in a same set of slots or a same set of resource blocks within a subframe as the MC/BC ACK/NACK feedback in the first PUCCH resource. For example, referring to FIGS. 5-7C, the base station 604 may transmit and the UE 602 may receive unicast data 605, 702, 712, 722, and the UE may determine a second PUCCH resource (e.g. one or more of the PUCCH resources 512, 522, 532, 542 in one of the PUCCH resource sets 510, 520, 530, 540 respectively) in response to the received unicast data. The base station may receive from the UE the MC/BC AF 612 in the first PUCCH resource and the unicast AF in the second PUCCH resource in the same set of slots within a subframe (e.g. using TDM as illustrated in FIG. 7A) or in a same set of resource blocks within the subframe as the unicast AF (e.g. using FDM as illustrated in FIG. 7B).

Figure 13:
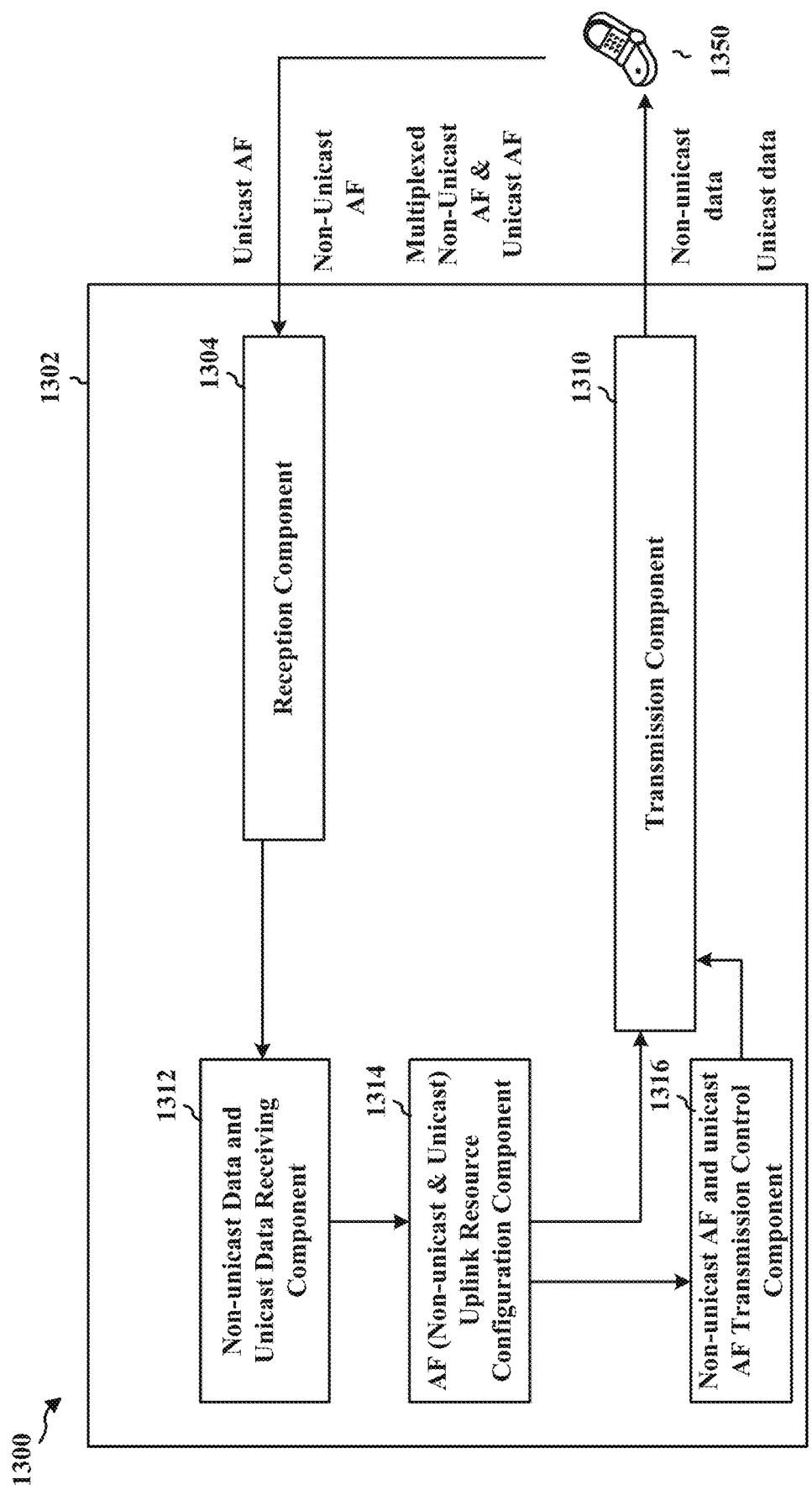
FIG. 13 is a data flow diagram illustrating the data flow between different means/components in an example apparatus.

FIG. 13 is a conceptual data flow diagram 1300 illustrating the data flow between different means/components in an example apparatus 1302. The apparatus 1302 may be a base station (e.g. base station 102/180, 310, 604, 1300) or one of its components (for example, a processing element and a modem) in communication with a UE (e.g. UE 104, 350, 602). The apparatus includes a non-unicast AF and unicast AF Transmission Control Component 1316 that transmits data to the UE as described in connection with step 1202 of FIG. 12. The transmitted data can be non-unicast data, such as MC/BC data, or unicast data. The non-unicast AF and unicast AF Transmission Control Component 1316 may also transmit a MC/BC configuration indicating a first PUCCH resource set and a unicast configuration indicating a second PUCCH resource set to the UE as described in connection with blocks 1201 and 1203 of FIG. 12.

The apparatus 1302 may also include an Acknowledgement Feedback (AF) Uplink Resource Configuration Component 1314 that may configure uplink resources for MC/BC AF and unicast AF. The apparatus further includes a non-unicast Data and Unicast Data Receiving Component 1312 that may receive MC/BC AF and unicast AF from the UE as described in connection with block 1210 of FIG. 12.

The apparatus 1302 may include additional components that perform each of the blocks of the algorithms described with reference to the call flow 600 and process 1200 of FIGS. 6 and 12, respectively. As such, each block described with reference to FIGS. 6 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
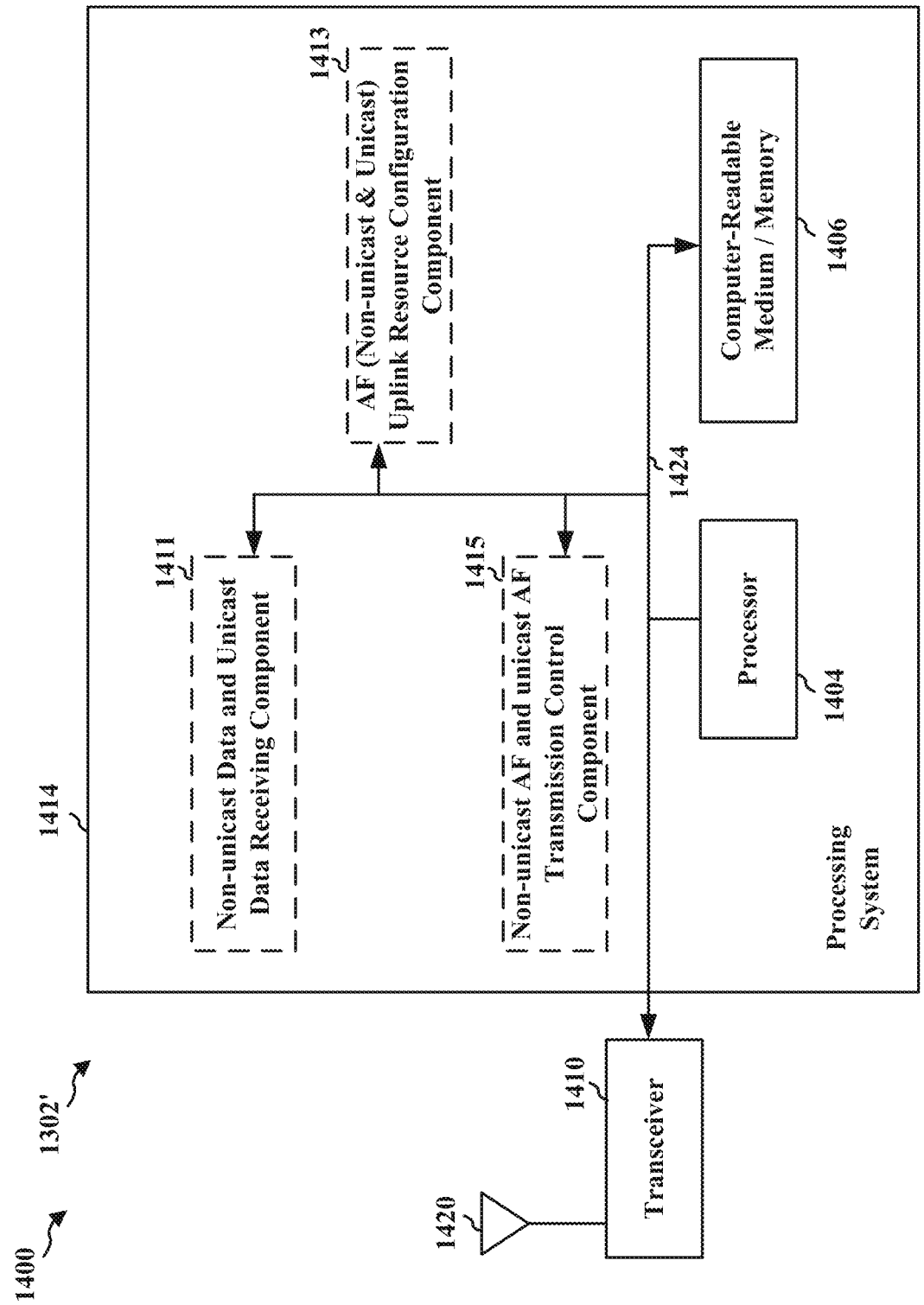
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1411, 1413, 1415, and the computer-readable medium/memory 1406. The bus 1424 may also link various other circuits such as timing sources, peripherals, voltage regulators, and power management circuits, which are well known in the art, and therefore, will not be described any further.

The processing system 1414 includes a non-unicast AF and unicast AF Transmission Control Component 1415 that transmits data to the UE as described in connection with step 1202 of FIG. 12. The transmitted data can be non-unicast data, such as MC/BC data, or unicast data. The non-unicast AF and unicast AF Transmission Control Component 1415 may also transmit a MC/BC configuration indicating a first PUCCH resource set and a unicast configuration indicating a second PUCCH resource set to the UE as described in connection with blocks 1201 and 1203 of FIG. 12. The processing system 1414 also includes an Acknowledgement Feedback (AF) Uplink Resource Configuration Component 1413 that may configure uplink resources for MC/BC AF and unicast AF. The processing system 1414 further includes a non-unicast Data and Unicast Data Receiving Component 1411 that may receive MC/BC AF and unicast AF from the UE as described in connection with block 1210 of FIG. 12.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414. In addition, the transceiver 1410 receives information from the processing system 1414, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described previously for any particular apparatus. The computer-readable medium/memory 1406 may also be used for storing data that is manipulated by the processor 1404 when executing software. The processing system 1414 further includes at least one of the components 1411, 1413, and 1415. The components may be software components running in the processor 1404, resident/stored in the computer readable medium/memory 1406, one or more hardware components coupled to the processor 1404, or some combination thereof.

The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302' for wireless communication includes means for transmitting, to a UE, a MC/BC configuration for one or more first PUCCH resources for transmitting MC/BC ACK/NACK feedback, a unicast configuration for one or more second PUCCH resources for transmitting unicast ACK/NACK feedback, the MC/BC configuration being different than the unicast configuration, and MC/BC data to the UE. The apparatus 1302' also includes means for receiving, in response to the transmitted MC/BC data, the MC/BC ACK/NACK feedback from the UE in the one or more first PUCCH resources, the one or more first PUCCH resources being based on the transmitted MC/BC configuration.

The aforementioned means may be one or more of the aforementioned components of the apparatus 1302' and/or the processing system 1414 of the apparatus 1302' configured to perform the functions recited by the aforementioned means. As described above, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The resource allocation techniques for uplink MC/BC AF and uplink unicast AF described herein provide mechanisms to send acknowledgement feedback of MC/BC data and unicast data to the base station. Although these techniques have been described in the context of 5G NR, these techniques may also be applicable to other multi-access technologies and the telecommunication standards that employ these technologies.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication performed by a user equipment (UE), comprising: receiving a multicast/broadcast (MC/BC) configuration indicating a first physical uplink control channel (PUCCH) resource set for transmitting MC/BC acknowledgement (ACK)/negative acknowledgement (NACK) feedback; receiving a unicast configuration indicating a second PUCCH resource set for transmitting unicast ACK/NACK feedback, the MC/BC configuration being different than the unicast configuration; receiving MC/BC data from a base station; determining a first PUCCH resource from the first PUCCH resource set for transmitting MC/BC ACK/NACK feedback in response to the received MC/BC data and based on the received MC/BC configuration; and transmitting the MC/BC ACK/NACK feedback to the base station in the determined first PUCCH resource.

Example 2 is the method of Example 1, further comprising receiving an offset value, wherein the determining of the first PUCCH resource for transmitting the MC/BC ACK/NACK feedback includes determining the first PUCCH resource based at least in part on adding the offset value to an identifier (ID) of a unicast or multicast PUCCH resource for transmitting the unicast ACK/NACK feedback.

Example 3 is the method of any of Examples 1 and 2, further comprising: receiving, on a physical downlink control channel (PDCCH), downlink control information (DCI) scheduling the MC/BC data, or receiving a control channel element (CCE) index of the PDCCH on which the MC/BC data is scheduled; and determining a PUCCH resource indicator (PRI) based on the received DCI or the CCE index, wherein determining the first PUCCH resource for transmitting the MC/BC ACK/NACK feedback comprises determining the first PUCCH resource based at least in part on the PRI.

Example 4 is the method of any of Examples 1 to 3, wherein the MC/BC configuration indicates the first PUCCH resource for transmitting the MC/BC ACK/NACK feedback.

Example 5 is the method of any of Examples 1 to 4, wherein the MC/BC configuration is received in a first set of radio resource control (RRC) parameters, and wherein the unicast configuration is received in a second set of RRC parameters, the first set of RRC parameters being different than the second set of RRC parameters.

Example 6 is the method of any of Examples 1 to 5, further comprising: receiving unicast data from the base station; determining a second PUCCH resource from the second PUCCH resource set for transmitting the unicast ACK/NACK feedback in response to the received unicast data; and transmitting, based on receiving the unicast data, the unicast ACK/NACK feedback in the determined second PUCCH resource in a same set of slots or a same set of resource blocks within a subframe as the MC/BC ACK/NACK feedback in the determined first PUCCH resource.

Example 7 is the method of any of Examples 1 to 6, wherein transmitting the MC/BC ACK/NACK feedback and transmitting the unicast ACK/NACK feedback comprises time-division-multiplexing or frequency-division-multiplexing the MC/BC ACK/NACK feedback and the unicast ACK/NACK feedback.

Example 8 is the method of any of Examples 1 to 7, further comprising: receiving unicast data from the base station; determining a second PUCCH resource from the second PUCCH resource set for transmitting the unicast ACK/NACK feedback in response to the received unicast data; and transmitting, based on receiving the unicast data, the unicast ACK/NACK feedback in the determined second PUCCH resource, the transmitting comprising appending the MC/BC ACK/NACK feedback to an end of the unicast ACK/NACK feedback within a hybrid automatic repeat request (HARQ) ACK/NACK codebook associated with the second PUCCH resource.

Example 9 is the method of any of Examples 1 to 8, wherein the appending comprises appending the MC/BC ACK/NACK feedback to the end of the unicast ACK/NACK feedback within the HARQ ACK/NACK codebook in response to receiving the unicast data after the MC/BC data.

Example 10 is the method of any of Examples 1 to 9, wherein the determining of the second PUCCH resource associated with the HARQ ACK/NACK codebook comprises determining the second PUCCH resource based on a PUCCH resource indicator (PRI) in a latest scheduling DCI among the unicast data and the MC/BC data.

Example 11 is the method of any of Examples 1 to 10, wherein the PRI comprises a unicast PRI determined based on unicast downlink control information (DCI) associated with the unicast ACK/NACK feedback when the latest scheduling DCI corresponds to the unicast data, and wherein the PRI comprises a MC/BC PRI determined based on MC/BC DCI associated with the MC/BC ACK/NACK feedback when the latest scheduling DCI corresponds to the MC/BC data.

Example 12 is the method of any of Examples 1 to 11, further comprising: receiving unicast data from the base station; determining a second PUCCH resource from the second PUCCH resource set for transmitting the unicast ACK/NACK feedback in response to the received unicast data; determining that the first PUCCH resource for transmitting the MC/BC ACK/NACK feedback and the second PUCCH resource for transmitting the unicast ACK/NACK feedback overlap in time; and determining, before transmitting the MC/BC ACK/NACK feedback, to drop the unicast ACK/NACK feedback from the second PUCCH resource based on the determination of the overlap.

Example 13 is the method of any of Examples 1 to 12, further comprising: selecting the first PUCCH resource set from a plurality of PUCCH resource sets based at least in part on a number of bits in uplink control information (UCI), the selected PUCCH resource set including the first PUCCH resource; and wherein the determining the first PUCCH resource comprises selecting the first PUCCH resource for transmitting the MC/BC ACK/NACK feedback from the selected PUCCH resource set based at least in part on a PUCCH resource indicator (PRI).

Example 14 is a device including one or more processors and one or more memories in electronic communication with the one or more processors storing instructions executable by the one or more processors to cause the system or apparatus to implement a method as in any of Examples 1-13.

Example 15 is a system or apparatus including means for implementing a method or realizing an apparatus as in any of Examples 1-13.

Example 16 is a non-transitory computer readable medium storing instructions executable by one or more processors to cause the one or more processors to implement a method as in any of Examples 1-13.

Example 17 is a method of wireless communication at a base station, comprising: transmitting, to a user equipment (UE), a multicast/broadcast (MC/BC) configuration indicating a first physical uplink control channel (PUCCH) resource set for transmitting MC/BC acknowledgement (ACK)/negative acknowledgement (NACK) feedback; transmitting, to the UE, a unicast configuration indicating a second PUCCH resource set for transmitting unicast ACK/NACK feedback, the MC/BC configuration being different than the unicast configuration; transmitting MC/BC data to the UE; and receiving, in response to the transmitted MC/BC data, the MC/BC ACK/NACK feedback from the UE in a first PUCCH resource of the first PUCCH resource set, the first PUCCH resource being based on the transmitted MC/BC configuration.

Example 18 is the method of Example 17, further comprising: transmitting unicast data to the UE; and receiving, in response to the transmitted unicast data, the unicast ACK/NACK feedback in a second PUCCH resource of the second PUCCH resource set in a same set of slots or a same set of resource blocks within a subframe as the MC/BC ACK/NACK feedback in the first PUCCH resource.

Example 19 is a device including one or more processors and one or more memories in electronic communication with the one or more processors storing instructions executable by the one or more processors to cause the system or apparatus to implement a method as in any of Examples 17 or 18.

Example 20 is a system or apparatus including means for implementing a method or realizing an apparatus as in any of Examples 17 or 18.

Example 21 is a non-transitory computer readable medium storing instructions executable by one or more processors to cause the one or more processors to implement a method as in any of Examples 17 or 18.

What is claimed is:
1. A method of wireless communication at a user equipment (UE), comprising:
receiving a first configuration associated with transmission on a first channel for transmitting hybrid automatic repeat request (HARQ) acknowledgement (ACK) feedback associated with unicast communication, the first configuration including a first value of a parameter;
receiving a second configuration associated with transmission on a second channel for transmitting HARQ ACK feedback for multicast data, the second configu- ration being separate from the first configuration, the second configuration including a second value of a parameter;
receiving a downlink control information (DCI) message;
receiving, from a network entity, a first data transmission;
detecting that the first data transmission is a multicast data transmission based on a radio network temporary identifier (RNTI) associated with the first data transmission; and
in response to receiving the first data transmission and the detection, transmitting, to the network entity, a first HARQ ACK feedback message for the multicast data transmission on a first resource identified for transmitting multicast acknowledgement feedback, wherein the first resource is identified based at least in part on a number of bits in uplink control information (UCI) and a physical uplink control channel (PUCCH) resource indicator (PRI) associated with the DCI message and application of the second value of the parameter included in the second configuration.

2. The method of claim 1, wherein the first value of the parameter includes a unicast PRI determined based on unicast DCI associated with the unicast communication when the first data transmission corresponds to unicast data transmission, wherein the second value of the parameter includes a multicast PRI determined based on multicast data DCI associated with multicast data when the first data transmission corresponds to multicast data transmission.

3. The method of claim 2, wherein the parameter is associated with a resource set associated with the first resource.

4. The method of claim 1, wherein the first resource is identified further based on at least one of a number of control channel elements (CCEs) in a control resource set (CORESET) associated with the DCI message, or an index of a CCE associated with the DCI message.

5. The method of claim 1, wherein the first resource is identified using a value that is applicable to a unicast data transmission.

6. The method of claim 1, further comprising:
receiving, from the network entity, a second data transmission, and the second data transmission comprises a unicast data transmission; and
transmitting, to the network entity, a second HARQ ACK feedback message associated with the second data transmission according to at least one of the first configuration or the second configuration based on the second data transmission.

7. The method of claim 6, further comprising:
appending the first HARQ ACK feedback message to the second HARQ ACK feedback message.

8. The method of claim 6, further comprising:
multiplexing the first HARQ ACK feedback message and the second HARQ ACK feedback message in one slot using one of time division multiplexing (TDM) or frequency division multiplexing (FDM).

9. The method of claim 1, wherein the second value of the parameter corresponds to an offset value.

10. An apparatus for wireless communication at a user equipment (UE), comprising:
a memory; and
at least one processor coupled to the memory and configured to:
receive a first configuration associated with transmission on a first channel for transmitting hybrid automatic repeat request (HARQ) acknowledgement (ACK) feedback associated with unicast communication, the first configuration including a first value of a parameter;
receive a second configuration associated with transmission on a second channel for transmitting HARQ ACK feedback for multicast data, the second configuration being separate from the first configuration, the second configuration including a second value of a parameter;
receive a downlink control information (DCI) message;
receive, from a network entity, a first data transmission;
detecting that the first data transmission is a multicast data transmission based on a radio network temporary identifier (RNTI) associated with the first data transmission; and
in response to receiving the first data transmission and the detection, transmit, to the network entity, a first HARQ ACK feedback message for the multicast data transmission on a first resource identified for transmitting multicast acknowledgement feedback, wherein the first resource is identified based at least in part on a number of bits in uplink control information (UCI) and a physical uplink control channel (PUCCH) resource indicator (PRI) associated with the DCI message and application of the second value of the parameter included in the second configuration.

11. The apparatus of claim 10, wherein the first value of the parameter includes a unicast PRI determined based on unicast DCI-associated with the unicast communication when the first data transmission corresponds to unicast data transmission, wherein the second value of the parameter includes a multicast PRI determined based on multicast data DCI associated with multicast data when the first data transmission corresponds to multicast data transmission.

12. The apparatus of claim 11, wherein the parameter is associated with a resource set associated with the first resource.

13. The apparatus of claim 10, wherein the first resource is identified further based on at least one of a number of control channel elements (CCEs) in a control resource set (CORESET) associated with the DCI message or an index of a CCE associated with the DCI message.

14. The apparatus of claim 10, wherein the first resource is identified using a value that is applicable to a unicast data transmission.

15. The apparatus of claim 10, wherein the at least one processor is further configured to:
receive, from the network entity, a second data transmission, and the second data transmission comprises a unicast data transmission; and
transmit, to the network entity, a second HARQ ACK feedback message associated with the second data transmission according to the first configuration or the second configuration based on the second data transmission.

16. The apparatus of claim 15, wherein the at least one processor is further configured to:
append the first HARQ ACK feedback message to the second HARQ ACK feedback message.

17. The apparatus of claim 15, wherein the at least one processor is further configured to:
multiplex the first HARQ ACK feedback message and the second HARQ ACK feedback message in one slot using one of time division multiplexing (TDM) or frequency division multiplexing (FDM).

18. The apparatus of claim 10, wherein the second value of the parameter corresponds to an offset value.

19. A method of wireless communication at a base station, comprising:
- transmitting a first configuration associated with transmission on a first channel for transmitting hybrid automatic repeat request (HARQ) acknowledgement (ACK) feedback associated with unicast communication, the first configuration including a first value of a parameter;
- transmitting a second configuration associated with transmission on a second channel for transmitting HARQ ACK feedback for multicast data, the second configuration being separate from the first configuration, the second configuration including a second value of a parameter;
- transmitting a downlink control information (DCI);
- transmitting, to a user equipment (UE), a first data transmission; and
- in response to the transmission and detection by the UE as a multicast data transmission according to a radio network temporary identifier (RNTI) associated with the first data transmission, receiving, from the UE, a first HARQ ACK feedback message for the multicast data transmission on a first resource of the channel identified for transmitting multicast acknowledgement feedback, wherein the first resource is identified based at least in part on a number of bits in uplink control information (UCI) and a physical uplink control channel (PUCCH) resource indicator (PRI) associated with the DCI message and application of the second value of the parameter included in the second configuration.

20. The method of claim 19, wherein the first value of the parameter includes a unicast PRI determined based on unicast DCI associated with the unicast communication when the first data transmission corresponds to unicast data transmission, wherein the second value of the parameter includes a multicast PRI determined based on multicast data DCI associated with multicast data when the first data transmission corresponds to multicast data transmission.

21. The method of claim 20, wherein the parameter is associated with a resource set associated with the first resource.

22. The method of claim 20, wherein the first resource is further based on at least one of a number of control channel elements (CCEs) in a control resource set (CORESET) associated with the DCI message transmitted to the UE, or an index of a CCE associated with the DCI message.

23. The method of claim 19, further comprising:
- transmitting, to the UE, a second data transmission; and
- receiving, from the UE on the channel, a second HARQ ACK feedback message associated with the second data transmission according to one of the first configuration or the second configuration based on the second data transmission, wherein the second data transmission comprises a unicast data transmission.

24. The method of claim 23, wherein the first HARQ ACK feedback message is appended to the second HARQ ACK feedback message.

25. The method of claim 23, wherein the first HARQ ACK feedback message is multiplexed with the second HARQ ACK feedback message in one slot using one of time division multiplexing (TDM) or frequency division multiplexing (FDM).

26. The method of claim 19, wherein the second value of the parameter corresponds to an offset value.

27. An apparatus for wireless communication at a base station, comprising:
- a memory; and
- at least one processor coupled to the memory and configured to:
  - transmit a first configuration associated with transmission on a first channel for transmitting hybrid automatic repeat request (HARQ) acknowledgement (ACK) feedback associated with unicast communication, the first configuration including a first value of a parameter;
  - transmit a second configuration associated with transmission on a second channel for transmitting HARQ ACK feedback for multicast data, the second configuration being separate from the first configuration, the second configuration including a second value of a parameter;
  - transmit a downlink control information (DCI) message;
  - transmit, to a user equipment (UE), a first data transmission; and
  - in response to the transmission and detection by the UE as a multicast data transmission according to a radio network temporary identifier (RNTI) associated with the first data transmission, receive, from the UE, a first HARQ ACK feedback message for the multicast data transmission on a first resource of the channel identified for transmitting multicast acknowledgement feedback, wherein the first resource is identified based at least in part on a number of bits in uplink control information (UCI) and a physical control channel (PUCCH) resource indicator (PRI) associated with the DCI message and application of the second value of the parameter included in the second configuration.

28. The apparatus of claim 27, wherein the first value of the parameter includes a unicast PRI determined based on unicast DCI associated with the unicast communication when the first data transmission corresponds to unicast data transmission, wherein the second value of the parameter includes a multicast PRI determined based on multicast data DCI associated with multicast data when the first data transmission corresponds to multicast data transmission.

29. The apparatus of claim 28, wherein the parameter is associated with a resource set associated with the first resource.

30. The apparatus of claim 27, wherein the second value of the parameter corresponds to an offset value.

* * * * *